United States Patent
Mizoguchi et al.

(10) Patent No.: US 9,551,269 B2
(45) Date of Patent: Jan. 24, 2017

(54) CONTROL DEVICE FOR COOLING FAN FOR VEHICLE

(75) Inventors: Norihide Mizoguchi, Kitakatsusika-gun (JP); Satoshi Tanaka, Oyama (JP)

(73) Assignee: KOMATSU LTD., Tokyo (JP)

( * ) Notice: Subject to any disclaimer, the term of this patent is extended or adjusted under 35 U.S.C. 154(b) by 1976 days.

(21) Appl. No.: 12/312,784

(22) PCT Filed: Nov. 29, 2007

(86) PCT No.: PCT/JP2007/073092
§ 371 (c)(1),
(2), (4) Date: May 29, 2009

(87) PCT Pub. No.: WO2008/069104
PCT Pub. Date: Jun. 12, 2008

(65) Prior Publication Data
US 2010/0064991 A1   Mar. 18, 2010

(30) Foreign Application Priority Data

Nov. 30, 2006 (JP) .................................. 2006-324053

(51) Int. Cl.
*F16D 65/78* (2006.01)
*F01P 7/04* (2006.01)
*B60T 5/00* (2006.01)

(52) U.S. Cl.
CPC .................. *F01P 7/044* (2013.01); *B60T 5/00* (2013.01); *F16D 65/78* (2013.01); *F01P 2025/60* (2013.01);
(Continued)

(58) Field of Classification Search
CPC . F16D 65/78; F16D 2065/783; F01P 2025/66; F01P 2060/06
(Continued)

(56) References Cited

U.S. PATENT DOCUMENTS 3,081,842 A * 3/1963 Kershner et al. ............. 188/71.5
4,083,469 A * 4/1978 Schexnayder ................ 414/509
(Continued)

FOREIGN PATENT DOCUMENTS

JP   U-06-065045   9/1994
JP   A-2000-110779   4/2000
(Continued)

OTHER PUBLICATIONS

Feb. 22, 2010 Office Action issued in corresponding Swedish Patent Application No. 09503830 (with translation).

*Primary Examiner* — Nicholas J Lane
(74) *Attorney, Agent, or Firm* — Oliff PLC

(57) ABSTRACT

A cooling-fan control device for a vehicle that increases the cooling capacity of a cooling oil that cools a brake rapidly and inhibits a brake damage in a case where the brake is applied during traveling or, in addition to the above-described problem-to-be-resolved, suppresses engine horsepower consumption and avoids consumption increase, while increasing the cooling capacity of the brake cooling oil. The rotation speed of the cooling fan is controlled to obtain the higher target rotation speed of a first target rotation speed corresponding to a detected cooling oil temperature and a second target rotation speed corresponding to a detected brake operation amount. The present invention is applicable to a vehicle in which an engine power is distributed to a travel power train and a hydraulic pump, drive wheels are operated via the travel power train, and the cooling fan is actuated via the hydraulic pump.

6 Claims, 13 Drawing Sheets

(52) U.S. Cl.
CPC ........ *F01P 2025/64* (2013.01); *F01P 2025/66* (2013.01); *F01P 2060/04* (2013.01); *F01P 2060/06* (2013.01); *F16D 2065/783* (2013.01)

(58) Field of Classification Search
USPC ......... 188/71.6, 264 R, 264 B, 264 D, 264 F, 188/264 CC, 264 P; 123/41.12
See application file for complete search history.

(56) References Cited

U.S. PATENT DOCUMENTS

| | | | |
|---|---|---|---|
| 4,798,177 A * | 1/1989 | Oomura et al. | 123/41.12 |
| 5,133,302 A * | 7/1992 | Yamada et al. | 123/41.12 |
| 5,178,238 A * | 1/1993 | Schaeff | 188/295 |
| 6,030,314 A * | 2/2000 | Brooks et al. | 477/92 |
| 6,349,882 B1* | 2/2002 | Kita et al. | 236/34 |
| 6,435,144 B1* | 8/2002 | Dicke et al. | 123/41.12 |
| 6,481,388 B1 | 11/2002 | Yamamoto | |
| 6,546,899 B1 | 4/2003 | Friedrich et al. | |
| 7,036,640 B2* | 5/2006 | Spielman | 188/264 P |
| 7,421,840 B2* | 9/2008 | Rose | 60/329 |
| 2006/0207842 A1* | 9/2006 | Strandberg | 188/264 D |
| 2010/0082205 A1* | 4/2010 | Sabelstrom | 701/48 |

FOREIGN PATENT DOCUMENTS

| | | |
|---|---|---|
| JP | A-2000-303837 | 10/2000 |
| JP | A-2001-182535 | 7/2001 |
| JP | A-2002-528326 | 9/2002 |
| WO | WO 02/47948 A1 | 6/2002 |

\* cited by examiner

CONTROL DEVICE FOR COOLING FAN FOR VEHICLE

TECHNICAL FIELD

The present invention relates to a control device for a cooling fan for a vehicle, and more particularly to a device that controls the rotation speed of a hydraulically driven cooling fan for cooling an oil-cooled retarder brake.

BACKGROUND ART

A dump truck is provided with a variety of brakes such as a foot brake, a retarder brake, a parking brake, an exhaust brake, and an emergency brake.

The front brake of a dump truck is constituted, for example, by a caliper brake. Furthermore, the rear brake is constituted by a wet multiplate brake and forcibly cooled by oil for cooling (cooling oil). A brake cooling circuit of the rear brake is so configured that the cooling oil circulates between the rear brake and the water-cooled oil cooler. The configuration is also such that cooling water of the oil cooler circulates between the oil cooler and the radiator. Hydraulic oil is supplied from a hydraulic pump that is driven by an engine to a hydraulic motor, and the rotation of the hydraulic motor drives the hydraulically driven fan for cooling the radiator.

The cooling oil in the brake cooling circuit absorbs the heat generated from the brake disk in the rear brake, and the absorbed amount of heat is dissipated by heat exchange with the cooling water in the water-cooled oil cooler. The cooling water is cooled in the radiator by a flow of air blown by the hydraulically driven cooling fan, and the heat of the cooling water is emitted into the atmosphere. Alternatively, this heat is directly dissipated into the atmosphere in an air-cooled oil cooler.

In the foot brake, the front brake and rear brake are actuated in accordance with the depression of a pedal.

In the retarder brake, only the rear brake is actuated in accordance with the operation of a retarder control lever.

Where the foot brake is continuously or repeatedly used when a dump truck descends a long slope, while carrying a heavy load, it is possible that the front brake will be overheated, the friction coefficient will be decreased, a fade effect will occur, and a brake efficiency will be degraded. Therefore, during downhill movement, the retarder brake is applied by operating the retarder control lever. With the retarder brake, braking is performed only with the rear brake that is forcibly cooled by cooling oil, the heat generated by the disk of the rear brake is absorbed by the cooling oil, and the occurrence of the fade effect or the like is inhibited.

The capacity of the retarder is typically determined by the cooling capacity of the cooling oil that is forcibly circulated. For this reason, the cooling capacity of the cooling oil has to be increased in order to increase the retarder capacity.

(Conventional Art 1 that has been Used)

In the conventional control of rotation speed of the aforementioned hydraulically driven cooling fan that has been heretofore performed in dump trucks, the cooling oil temperature and engine cooling water temperature are detected by respective sensors installed on the vehicle, the fan rotation speed is adjusted so that the rotation speed of the hydraulically driven cooling fan increases as the detected cooling oil temperature and cooling water temperature rise, the cooling capacity of the cooling oil rises, and the cooling oil is prevented from overheating.

The below-described patent documents relate to rotation speed control of a hydraulically driven cooling fan in the field of vehicles other than a dump truck, for example, a hydraulic shovel and a bulldozer.

(Conventional Art 2 Disclosed in a Patent Document)

Patent Document 1 describes an invention according to which in a configuration provided with an oil cooler that cools hydraulic oil for driving a working machine and a hydraulically driven cooling fan that cools the hydraulic oil that passes through the oil cooler, the temperature of the engine cooling water, temperature of the hydraulic oil, and rotation speed of the engine are detected by respective sensors, and the rotation speed of the hydraulically driven cooling fan is controlled correspondingly to the detected values of the sensors.

(Conventional Art 3 Disclosed in a Patent Document)

Patent Document 2 describes an invention according to which in a configuration provided with an oil cooler that cools hydraulic oil for driving a working machine and a hydraulically driven cooling fan that cools the hydraulic oil that passes through the oil cooler, the temperature of the engine cooling water, temperature of the hydraulic oil, and temperature of an intake air are detected by respective sensors, and the rotation speed of the hydraulically driven cooling fan is controlled correspondingly to the detected values of the sensors.

Patent Document 1: Japanese Patent Application Laid-open No. 2001-182535

Patent Document 2: Japanese Patent Application Laid-open No. 2000-110779

DISCLOSURE OF THE INVENTION

Problems to be Solved by the Invention

According to the conventional art 1, a retarder brake is actually operated after the retarder control lever has been operated, heat is generated in the rear brake, this heat is transferred to the engine cooling water in the oil cooler, the cooling water temperature and cooling oil temperature rise, this rise in the cooling water temperature and cooling oil temperature is detected by sensors, and then the rotation speed of the hydraulically driven cooling fan is increased. As a result, there is a time lag between when the retarder control lever is operated and when the rotation speed of the hydraulically driven cooling fan actually rises and cooling capacity actually increases. The resultant problem is that the cooling oil is overheated and rear brake may be damaged.

According to the conventional art 2 and conventional art 3, the cooling fan is used for cooling the hydraulic oil serving to actuate a working machine such as a hydraulic shovel and is not used for cooling the cooling oil for cooling the brakes, which is the object of the present invention. Furthermore, because the control of the rotation speed of the cooling fan is performed after the cooling water temperature or the like has been detected by a sensor, a problem arises that is similar to that associated with the above-described conventional art 1.

The present invention has been made with the foregoing in view, and a problem to be resolved by the present invention is to increase the cooling capacity of the brake rapidly and prevent the brake from damaging in case the brake is actuated during traveling.

Means to Solve the Problems

A first aspect of the invention relates to a control device for a cooling fan for a vehicle in which cooling oil supplied to an oil-cooled brake is cooled by the cooling fan, including:

cooling oil temperature detection means for detecting a temperature of the cooling oil;

first target rotation speed setting means for setting a first target rotation speed of the cooling fan, the first target rotation speed corresponding to the temperature of the cooling oil;

brake operation means for operating the brake;

brake operation amount detection means for detecting an operation amount of the brake operation means;

second target rotation speed setting means for setting a second target rotation speed of the cooling fan, the second target rotation speed corresponding to the brake operation amount; and rotation speed control means for controlling the rotation speed of the cooling fan so as to obtain the higher target rotation speed of the first target rotation speed corresponding to the detected cooling oil temperature and the second target rotation speed corresponding to the detected brake operation amount.

A second aspect of the invention is the first aspect of the invention that is applied to a vehicle in which an engine power is distributed to a travel power train and a hydraulic pump, drive wheels are actuated via the travel power train, and the cooling fan is actuated via the hydraulic pump.

A third aspect of the invention is the first aspect of the invention, wherein vehicle stop detection means for detecting that the vehicle has stopped is provided, and the rotation speed of the cooling fan is controlled so as to obtain the higher target rotation speed of the first target rotation speed and the second target rotation speed, on condition that the vehicle is not detected to have stopped.

A fourth aspect of the invention is the first aspect of the invention, wherein the oil-cooled brake is a retarder brake.

A fifth aspect of the invention is the first aspect of the invention wherein a retarder brake and a foot brake are provided as the oil-cooled brake at the vehicle; and the rotation speed of the cooling fan is controlled so as to obtain the higher target rotation speed of the first target rotation speed corresponding to the detected cooling oil temperature and the second target rotation speed corresponding to the detected brake operation amount.

A sixth aspect of the invention is the first aspect of the invention, wherein the rotation speed control means controls the rotation speed of the cooling fan so as to obtain the higher target rotation speed of the first target rotation speed corresponding to the detected cooling oil temperature and the second target rotation speed corresponding to the detected brake operation amount, on condition that the oil-cooled brake is detected to have been operated.

A seventh aspect of the invention is the fifth aspect of the invention, wherein the rotation speed control means controls the rotation speed of the cooling fan so as to obtain the higher target rotation speed of the first target rotation speed corresponding to the detected cooling oil temperature and the second target rotation speed corresponding to the detected brake operation amount, on condition that at least one of the retarder brake and the foot brake has been operated.

An eighth aspect of the invention relates to a control device for a cooling fan for a vehicle in which cooling oil supplied to an oil-cooled brake is cooled by the cooling fan, including:

cooling oil temperature detection means for detecting a temperature of the cooling oil;

first target rotation speed setting means for setting a first target rotation speed of the cooling fan, the first target rotation speed corresponding to the temperature of the cooling oil;

inclination angle detection means for detecting a descent gradient;

second target rotation speed setting means for setting a second target rotation speed of the cooling fan, the second target rotation speed corresponding to the descent gradient; and rotation speed control means for controlling the rotation speed of the cooling fan so as to obtain the higher target rotation speed of the first target rotation speed corresponding to the detected cooling oil temperature and the second target rotation speed corresponding to the detected descent gradient.

A ninth aspect of the invention is the first aspect of the invention, wherein an estimated oil temperature rise width of a brake cooling oil temperature corresponding to the current operation amount of the brake is calculated, and the second target rotation speed is set on the basis of the estimated oil temperature rise width.

A tenth aspect of the invention is the first aspect of the invention, wherein a necessary fan rotation speed increase width of a rotation speed of the cooling fan is calculated, the necessary fan rotation speed corresponding to the current operation amount of the brake, and the second target rotation speed is set on the basis of the necessary fan rotation speed increase width.

In the vehicle 1 according to the first aspect of the invention, as shown in FIG. 3, the cooling oil supplied to the oil-cooled brake 5 is cooled directly by the cooling fan 32 or with cooling water. As shown in FIG. 4, a temperature Tb of the cooling oil is detected by the cooling oil temperature detection means 52.

In the first target rotation speed setting means 61, as shown in FIG. 5, the first target rotation speed N1 of the cooling fan 32 that corresponds to the temperature Tb of the cooling oil is set. Where the oil-cooled brake 5 is operated by the brake operation means 14 as shown in FIG. 2, the operation amount Sb of the brake operation means 14 is detected by the brake operation amount detection means 56, as shown in FIG. 4. In the second target rotation speed setting means 62, as shown in FIG. 5, the second target rotation speed N2 of the cooling fan 32 that corresponds to the brake operation amount Sb is set.

As shown in FIG. 6, the rotation speed control means 63 controls the rotation speed N of the cooling fan 32 so as to obtain the higher target rotation speed of the first target rotation speed N1 corresponding to the detected cooling oil temperature Tb and the second target rotation speed N2 corresponding to the detected brake operation amount Sb (step 104, see FIG. 5). According to the sixth aspect of the invention, the rotation speed N of the cooling fan 32 is controlled in the same manner (step 104) on condition that the oil-cooled brake 5 is detected to have been operated (determination YES in step 101). As a result, in a case where the oil-cooled brake 5 is operated by the brake operation means 14 and the second target rotation speed N2 corresponding to the brake operation amount Sb of the oil-cooled brake exceeds the first target rotation speed N1 corresponding to the detected cooling oil temperature Tb, it is determined that the brake cooling capacity has to be increased because the cooling oil temperature will rise, and the rotation speed N of the hydraulically driven cooling fan 32 is regulated to the second target rotation speed N2 corresponding to the brake operation amount Sb. By contrast, even when the oil-cooled brake 5 has been operated by the brake operation means 14, if the second target rotation speed N2 corresponding to the brake operation amount Sb of the retarder control brake is below the first target rotation speed N1 corresponding to the detected cooling oil temperature Tb, it is determined that the cooling oil temperature has already risen and the brake capacity has sufficiently increased, and the rotation speed N of the cooling fan 32 is regulated to the first target rotation speed N1 corresponding to the present detected cooling oil temperature Tb.

According to the present invention, for example, at a point of time when the retarder control lever (brake operation means 14) is operated, it is determined that the brake cooling capacity has to be increased. Then, the brake cooling capacity can be increased in advance before the brake cooling oil temperature Tb actually rises. Therefore, there is practically no time lag between the operation of the retarder control lever 14 and the actual increase in the rotation speed of the hydraulically driven cooling fan 32 that results in the increase in cooling capacity. As a result, a short time elapses before the maximum retarder capacity is brought out, an event in which the cooling oil is overheated before the maximum retarder capacity is demonstrated can be avoided, and an event in which the oil-cooled rear brake 5 is damaged can be avoided.

Furthermore, because the brake cooling efficiency is increased, it is possible to reduce the capacity of oil cooler 30 and hydraulic pump 42 that constitute the brake cooling circuit, as shown in FIG. 3. As a result, a compact brake cooling circuit can be designed and the degree of freedom in designing the layout of the brake cooling circuit is increased.

According to the second aspect of the present invention, the above-described first aspect of the invention is applied to the vehicle 1 in which the power of engine 2 is distributed, as shown in FIG. 1, to the travel power line 3 and hydraulic pump 40 (41, 42, 43), drive wheels 12 are actuated via the travel power train 3, and the cooling fan 32 is actuated via the hydraulic pump 40 (43).

For example, the retarder brake is almost exclusively actuated during downhill movement or deceleration of the vehicle 1 such as a dump truck. During downhill movement or deceleration, a drive torque is inputted from the drive wheels 12 to the engine 2 via the travel power train 3 and the engine 2 is driven. Therefore, the energy for raising the rotation speed N of the cooling fan 32 to the second target rotation speed N2 is obtained from the energy inputted from the drive wheels 12. As a result, energy efficiency can be increased and fuel consumption is not affected despite the increase in cooling capacity of the brake and increase in retarder capacity.

According to the third aspect of the present invention, as shown in FIG. 4, the vehicle stop detection means 53 for detecting that the vehicle 1 has stopped is provided, and the rotation speed N of the cooling fan 32 is controlled (step 104 in FIG. 6; control during brake operation) so as to obtain the higher target rotation speed of the first target rotation speed N1 and second target rotation speed N2 on condition that the vehicle 1 is not detected to have stopped (determination NO in step 102 in FIG. 6).

A state in which the oil-cooled rear brake 5 is overheated and cooling capacity has to be increased is almost always realized when the vehicle 1 travels, while the rear brake 5 is actuated. For example, even in a case where the brake operation amount Sb is large, if the vehicle 1 is stopped, the oil-cooled rear brake 5 will not overheat and no need to increase cooling capacity. Furthermore, the operator sometimes operates the brake control means 14 (retarder control lever 14), while the vehicle 1 is stopped. Conversely, where the control is performed in this state so as to increase the rotation speed N of the cooling fan 32 to the second target rotation speed N2, the cooling fan 32 is unnecessarily driven and fuel consumption is increased.

According to the third aspect of the present invention, even if the brake has been operated (determination YES in step 101 in FIG. 6), if the vehicle 1 is stopped (determination YES in step 102 in FIG. 6), the normal control is performed (step 103), and the rotation speed of the cooling fan 32 is not controlled so as to obtain the higher target rotation speed N of the first target rotation speed N1 and second target rotation speed N2 (step 104). Therefore, the cooling fan 32 is not driven unnecessarily and loss in horsepower of the engine 2 and loss of energy can be inhibited.

According to the fourth aspect of the present invention, the above-described first aspect is applied under an assumption that the oil-cooled brake 5 is a retarder brake.

According to the fifth aspect of the present invention, the vehicle 1 is assumed to be provided with a retarder brake and a foot brake as the oil-cooled brake 5. Furthermore, the rotation speed N of the cooling fan 32 is controlled so as to obtain the higher target rotation speed N of the first target rotation speed N1 corresponding to the detected cooling oil temperature Tb and the second target rotation speed N2 corresponding to the detected brake operation amount Sb, Sb'. According to the seventh aspect of the present invention, the rotation speed N of the cooling fan 32 is similarly controlled on condition that at least either of the retarder brake or the foot brake has been operated.

For example, in a case of a dump truck, the oil-cooled brake is a rear brake 5. When the retarder brake is actuated, the rear brake 5 is actuated, while, when the foot brake is actuated, the front brake 13 and rear brake 5 are actuated. In other words, where at least either of the retarder brake or foot brake is operated, the oil-cooled brake (rear brake 5) is operated. Where the control similar to that of the first aspect of the present invention is carried out in this state, the brake cooling capacity of the oil-cooled brake 5 can be rapidly increased, without a time lag after the brake operation, in the same manner as in the first aspect of the present invention.

According to the first aspect of the present invention, it is determined that the brake cooling capacity has to be increased on the basis of operation of the brake operation means 14 (retarder control lever 14).

However, in accordance with the present invention, instead of detecting that the brake has been actually operated, it is also possible to assume that "the brake has been operated" by detecting a state in which the brake operation is necessary, namely, a downhill movement, and perform the control during brake operation.

According to the eighth aspect of the present invention, an inclination angle detection means for detecting a descent gradient θ (an inclination angle of the vehicle or an inclination angle of the road) is used instead of the "brake operation amount detection means 56" of the first aspect.

Furthermore, according to the eighth aspect of the present invention, the second target rotation speed N2 corresponding to the descent gradient θ is set instead of the second target rotation speed N2 corresponding to brake operation amount Sb in the first aspect of the invention. The brake is assumed to be operated by a larger operation amount as the descent gradient θ increases. Accordingly a larger value of the second target rotation speed N2 is set.

According to the ninth aspect of the present invention, as shown in FIG. 11, an estimated oil temperature rise width ΔTb of a brake cooling oil temperature Tb corresponding to the present brake operation amount Sb is found and the second target rotation speed N2 is set on the basis of the estimated oil temperature rise width ΔTb.

According to the tenth aspect of the present invention, as shown in FIG. 12, a necessary fan rotation speed increase width ΔN of the rotation speed N of the hydraulically driven cooling fan 32 that corresponds to the present brake operation amount Sb is obtained and the second target rotation speed N2 is set on the basis of the necessary fan rotation speed increase width ΔN.

BEST MODE FOR CARRYING OUT THE INVENTION

Embodiments of the control device for a cooling fan for a vehicle according to the present invention will be described below with reference to the appended drawings. In the embodiments, a dump trunk will be assumed as the vehicle.

FIG. 1 is a block diagram illustrating the configuration of a travel power train 3 of a vehicle 1 of the embodiments. The configuration of the dump truck 1 is shown with respect to the components relating to the present invention.

As shown in FIG. 1, in the vehicle 1, power of an engine 2 is distributed to the travel power train 3 and hydraulic pumps 40 (41, 42, 43 . . . ). Drive wheels 12 are driven via the travel power train 3, and as will be described below, hydraulic oil is supplied to a steering mechanism and a hoist mechanism (not shown in the figure) via the hydraulic pumps 40 and cooling oil is supplied to the below-described rear brake.

An output shaft 6 of the engine 2 of the vehicle 1 is linked to a PTO 7. The PTO 7 is linked to a torque converter 8 and also linked to the hydraulic pumps 40.

A portion of the output of the engine 2 is transmitted to rear wheels 12 that are drive wheels via the PTO 7, the torque converter 8, a transmission 9, a reducing mechanism (differential gear) 10, and an axle (rear axle) 11. Furthermore, the remaining output of the engine 2 is transmitted via the PTO 7 to the hydraulic pumps 40. Shifting of the transmission 9 is performed based on a control signal outputted from a shifting controller 161. The controller 161 inputs an operation signal of a shift lever 28 and generates and outputs a control signal to the transmission 9. The shift lever 28 is provided with shift lever positions such as "Nt (neutral position; neutral)", "R (rearward position)", and "D (drive; automatic shift from the lowest speed state to the highest speed stage)". When the vehicle 1 is stopped, the shift lever 28 is operated to the neutral position "Nt".

FIG. 2 is a hydraulic circuit diagram illustrating the configuration of the brake control circuit of the vehicle 1 of the embodiments. The configuration of the dump truck 1 is shown with respect to the components relating to the present invention.

The dump truck 1 is provided with a variety of brakes such as a foot brake, a retarder brake, a parking brake, an exhaust brake, and an emergency brake. FIG. 2 shows only the configuration of the foot brake, retarder brake, and parking brake that relate to the present invention; the configuration of other brakes is omitted.

A front brake 13 of the dump truck 1 is constituted, for example, by a caliper disk. Furthermore, a rear brake 5 is constituted by a wet multiplate disk. The front brake 13 and rear brake 5 are hydraulic brakes that are actuated and released by the hydraulic oil.

The foot brake actuates the front brake 13 and rear brake 5 in response to the operation of a pedal 4. When the foot brake operates, a brake piston 13b of a caliper 13a of the front brake 13 operates to apply pressure to a front brake disk 13c, and a brake piston 23a of a slack adjuster 23 of the rear brake 5 operates to apply pressure to a rear brake disk 5a, whereby the foot brake is operated.

The retarder brake actuates the rear brake 5 in response to the operation of a retarder control lever 14. When the retarder brake operates, the brake piston 23a of the slack adjuster 23 of the rear brake 5 operates to apply pressure to the rear brake disk 5a.

The parking brake actuates only the rear brake 5 in response to the operation of a parking switch 20. When the parking brake operates, a brake piston 25a of a cylinder chamber 25 of the rear brake 5 operates to apply pressure to the rear brake disk 5a.

The hydraulic pump 41 for brake actuation acts as a hydraulic oil supply source and supplies brake hydraulic oil to the front brake 13 and rear brake 5.

A foot brake operation valve 15 is constituted by a front wheel operation valve 16 and a rear wheel operation valve 17, and the valve position changes to open positions 16a, 17a, respectively, in response to a step-on operation of the pedal 4.

Where the pedal 4 is stepped on, the front wheel operation valve 16 operates to the open position 16a, and pressurized oil discharged from the hydraulic pump 41 for brake actuation and accumulated in accumulators 27, 18 is supplied via the front wheel operation valve 16 to the front brake 13. As a result, the brake piston 13b of the caliper 13a of the front brake 13 operates to apply pressure to the front brake disk 13c, and the front wheels 21 of the vehicle 1 are braked. Furthermore, where the pedal 4 is stepped on, the rear wheel operation valve 17 operates to the open position 17a, and pressurized oil discharged from the hydraulic pump 41 for brake actuation and accumulated in accumulators 27, 22 is supplied via the rear wheel operation valve 17 and a shuttle valve 36 to the slack adjuster 23. Where the hydraulic oil is supplied to the slack adjuster 23, the brake piston 23a of the slack adjuster 23 of the rear brake 5 operates to apply pressure to the brake disk 5a and the rear wheels 12 of the vehicle 1 are braked. In the slack adjuster 23, the brake piston 23a operates so as to obtain a constant stroke of the brake piston 23a.

Where the parking switch 20 is operated, an operation valve 24 for parking is actuated to a return position 24a, and the hydraulic oil located in a cylinder chamber 25 of the rear brake 5 returns via the operation valve 24 for parking to a tank 26. As a result, a spring 25b located inside the cylinder chamber 25 is biased to an extension side, the brake piston 25a operates to apply pressure to the rear brake disk 5a, and the rear wheels 12 are braked. When the parking switch 20 is not operated, the operation valve 24 for parking operates to a supply position 24b, and the hydraulic oil discharged from the hydraulic pump 41 for brake actuation is supplied to the cylinder chamber 25 of the rear brake 5 via the accumulator 27 and operation valve 24 for parking. As a result, the spring 25b located inside the cylinder chamber 25 is biased to a contracted side, the brake piston 25a operates to withdraw from the rear brake disk 5a, and the rear wheels 12 are released from the rear brake 5.

Where the retarder control lever 14 is operated, an electric signal corresponding to the brake operation amount Sb thereof is applied to an electromagnetic proportional pressure reducing valve 35 for a retarder, the valve is actuated to an open position in which the spring 35a is contracted, and the pressurized oil discharged from the hydraulic valve 41 for brake actuation and accumulated in the accumulator 27 is supplied to the slack adjuster 23 via the electromagnetic proportional pressure reducing valve 35 for a retarder and shuttle valve 36. Where the hydraulic oil is supplied to the slack adjuster 23, the brake piston 23a of the slack adjuster 23 of the rear brake 5 operates to apply pressure to the rear brake disk 5a and the rear wheels 12 of the vehicle 1 are braked.

FIG. 3 is a hydraulic circuit diagram illustrating the components of the cooling circuit of the rear brake 5 that relate to the present invention.

As shown in FIG. 3, the hydraulic oil is supplied to the rear brake disk 5a of the rear brake 5 and an oil cooler 30 by using a hydraulic pump 42 for cooling as a cooling oil supply source.

Thus, the hydraulic pump 42 for cooling discharges an oil for cooling (cooling oil). The cooling oil is supplied to the rear brake disk 5a of the rear brake 5, caused to pass around the rear brake disk 5a, and then supplied to the oil cooler 30. The cooling oil that has passed through the oil cooler 30 is returned to a tank 31. The cooling oil located in the tank 31 is sucked in by the hydraulic pump 42 for cooling, and the cooling oil then circulates in a similar manner in a rear brake cooling circuit that includes the rear brake 5 and oil cooler 30.

The oil cooler 30 is a water-cooled oil cooler specifically designed for brake cooling. The oil cooler is installed in a lower tank of the radiator 19. The cooling oil that passes through the oil cooler 30 is cooled by the cooling water of the engine 2. Thus, the cooling water of the engine 2 is cooled, while passing through a cooling water passage of the radiator 19, then, in the lower tank of the radiator 19, passes through the cooling water passage of the oil cooler 30, and cools the cooling oil that is passing through the oil cooler 30.

A hydraulically driven cooling fan 32 is disposed opposite the radiator 19.

Where the cooling oil located in the brake cooling circuit is supplied to the rear brake 5, the heat generated by the rear brake disk 5a of the rear brake 5 is absorbed by the cooling oil. The cooling oil that has absorbed the heat is supplied to the oil cooler 30. The engine cooling water is supplied to the cooling water path of the oil cooler 30, heat exchange is carried out between the cooling water and cooling oil, and the heat of the cooling oil is dissipated. The heat of the cooling water is dissipated by heat exchange between the radiator 19 and the air blown by the hydraulically driven cooling fan 32.

FIG. 4 shows a configuration example of a device for drive controlling the hydraulically driven cooling fan 32.

In the drive control device, the hydraulically driven cooling fan 32 is driven by using a variable-displacement hydraulic pump 43 for fan driving as a drive source.

Thus, the variable-displacement hydraulic pump 43 for fan driving is driven by the engine 2 (see FIG. 1). A hydraulic motor 33 for fan driving is driven by a pressurized oil discharged from the variable-displacement hydraulic pump 43 for fan driving. The hydraulic motor 33 for fan driving is a fixed-displacement hydraulic motor. The hydraulically driven cooling fan 32 is driven by the hydraulic motor 33 for fan driving. As a result, the pressurized oil discharged from the hydraulic pump 43 for fan driving is supplied to the hydraulic motor 33 for fan driving, and the hydraulic motor 33 for fan driving and the hydraulically driven cooling fan 32 that are connected in series therewith are rotated.

A swash plate 43a of the hydraulic pump 43 for fan driving is drive controlled by a swash plate drive unit 34. The capacity (cc/rev) of the hydraulic pump 43 for fan driving is regulated by drive control performed by the swash plate drive unit 34. The swash plate drive unit 34 is actuated by an electric control signal. Where an electric control signal is applied to the swash plate drive unit 34, the swash plate 43a of the hydraulic pump 43 for fan driving is driven in response to the electric control signal, and the displacement (cc/rev) of the hydraulic pump 43 for fan driving is changed. As a result, the flow rate of pressurized oil discharged from the hydraulic pump 43 for fan driving is changed, the flow rate of the pressurized oil supplied to the hydraulic motor 33 for fan driving is changed, and the rotation speed N of the hydraulically driven cooling fan 32 is changed.

The engine 2 is provided with an engine revolution speed sensor 50 that detects the revolution speed Ne (r/min) of the engine 2.

An engine cooling water temperature sensor 51 that detects a temperature (engine cooling water temperature) Tc (° C.) of the engine cooling water is provided in the cooling water passage of the engine 2.

A brake cooling oil temperature sensor 52 that detects a temperature (brake cooling oil temperature) Tb (° C.) of the brake cooling oil is provided in the tank 31 of the rear brake cooling circuit.

The vehicle 1 is provided with a vehicle stop detection means 53 for detecting the stop of the vehicle 1.

The vehicle stop detection means 53 is constituted, for example, by the parking switch 20, a vehicle speed sensor 54, and a shift position sensor 55.

The vehicle speed sensor 54 detects a velocity of the vehicle 1 (vehicle speed) V. The vehicle speed V is computed, for example, by detecting an output rotation speed of the transmission 9.

The shift position sensor 55 detects the operation of the shift lever 28 to a neutral "Nt" shift lever position.

In the present embodiment, the vehicle 1 is determined to have stopped by a combination of detection signals of the parking switch 20, vehicle speed sensor 54, and shift position sensor 55.

Examples of determining that the vehicle 1 has stopped are described below.

(1) First Determination Example

The vehicle 1 is determined to have stopped when either of a condition of the parking switch 20 being operated ON (parking brake actuation) or a condition of the vehicle speed V being zero or close to zero and the shift lever 28 being in the neutral position "Nt" is fulfilled.

(2) Second Determination Example

The vehicle 1 is determined to have stopped when any one of a condition of the parking switch 20 being operated ON (parking brake actuation), a condition of the vehicle speed V being zero or close to zero, and a condition of the shift lever 28 being in the neutral position "Nt" is fulfilled.

The vehicle 1 may be also determined to have stopped on the basis of detection signals of any two sensors from among the parking switch 20, vehicle speed sensor 54, and shift position sensor 55. Furthermore, the vehicle 1 may be also determined to have stopped on the basis of a detection signal of any one sensor from among the parking switch 20, vehicle speed sensor 54, and shift position sensor 55.

The retarder control lever 14 is provided with a brake operation amount sensor 56 that detects the operation amount Sb (retarder control lever displacement) of the retarder control lever 14.

The controller 60 is control means constituted, for example, by a CPU, a ROM, a RAM, and the like. A detection signal Ne of the engine revolution speed sensor 50, a detection signal Tc of the engine cooling water temperature sensor 51, a detection signal Tb of the brake cooling oil temperature sensor 52, detection signals of the vehicle stop detection means 53 (parking switch 20, vehicle speed sensor 54, and shift position sensor 55), and a detection signal Sb of the brake operation amount sensor 56 are inputted to an input port of the controller 60.

A control program for executing the below-described "normal control" and "control during brake operation" is installed in the ROM of the controller 60. The control program is executed in the CPU of the controller 60, and an electric control signal for drive controlling the swash plate drive unit 34 is generated. The generated electric control signal is outputted from an output port of the controller 60 to the swash plate drive unit 34. The electric control signal value outputted to the swash plate drive unit 34 corresponds to a target rotation speed of the hydraulically driven cooling fan 32. Where the electric control signal is applied to the swash plate drive unit 34, the swash plate 43a of the hydraulic pump 43 for fan driving is driven in response to the electric control signal, and the displacement of the hydraulic pump 43 for fan driving is regulated. As a result, the flow rate of the pressurized oil discharged from the hydraulic pump 43 for fan driving is regulated, the flow rate of the pressurized oil supplied to the hydraulic motor 33 for fan driving is regulated, and the rotation speed N of the hydraulically driven cooling fan 32 is regulated to the target rotation speed.

The controller 60 includes first target rotation speed setting means 61, second target rotation speed setting means 62, and rotation speed control means 63.

Control According to the First Embodiment

In the first embodiment, control is performed under an assumption of the above-described device configuration shown in FIG. 4.

The detection signal Ne of the engine revolution speed sensor 50, detection signal Tc of the engine cooling water temperature sensor 51, and detection signal Tb of the brake cooling oil temperature sensor 52 are inputted to the first target rotation speed setting means 61 of the controller 60, and the first target rotation speed N1 of the fan 32 for cooling is set. The detection signal Ne of the engine revolution speed sensor 50 and detection signal Sb of the brake operation amount sensor 56 are inputted to the second target rotation speed setting means 62 of the controller 60, and the second target rotation speed N2 of the fan 32 for cooling is set. The detection signal Sb of the brake operation amount sensor 56, detection signals of the vehicle stop detection means 53, set target rotation speed N1 of the first target rotation speed setting means 61, and set target rotation speed N2 of the second target rotation speed setting means 62 are inputted to the rotation speed control means 63 of the controller 60, an electric control signal for performing the normal control or an electric control signal for performing the control during brake operation is generated, and the generated electric control signal is outputted to the swash plate drive unit 34.

First, the contents of the "normal control" will be described.

The normal control is a control corresponding to the above-described conventional art 1. In this control, the target rotation speed N1 (referred to hereinbelow as the first target rotation speed) of the hydraulically driven cooling fan 32 is determined on the basis of the engine cooling water temperature Tc, brake cooling oil temperature Tb, and engine revolution speed Ne, and the rotation speed N of the hydraulically driven cooling fan 32 is regulated so as to be equal to the first target rotation speed N1.

The normal control will be explained below with reference to FIG. 5.

FIG. 5 shows a control map that is used to determine the first target rotation speed N1 of the hydraulically driven cooling fan 32 on the basis of the engine cooling water temperature Tc, brake cooling oil temperature Tb, and engine revolution speed Ne and also determine the second target rotation speed N2 of the hydraulically driven cooling fan 32 on the basis of the brake operation amount Sb.

The revolution of the engine 2 falls within a range from a low idle revolution speed NeL to a high idle revolution speed NeH. A line LNmax is a maximum line indicating the maximum target rotation speed of the hydraulically driven cooling fan 32 correspondingly to each engine revolution speed Ne. A line LNmin is a minimum line indicating the minimum target rotation speed of the hydraulically driven cooling fan 32 correspondingly to each engine revolution speed Ne. The target rotation speed of the hydraulically driven cooling fan 32 varies within a region located between the maximum line LNmax and minimum line LNmin.

In the normal control, a target line LN1 is set within this region so as to be a line with a higher target rotation speed as the engine cooling water temperature Tc and brake cooling oil temperature Tb rise. When the engine cooling water temperature Tc and brake cooling oil temperature Tb are the lowest temperatures, the minimum line LNmin is set as the line LN1 of the first target rotation speed. When the engine cooling water temperature Tc and brake cooling oil temperature Tb are the highest temperatures, the maximum line LNmax is set as the line LN1 of the first target rotation speed. When the engine cooling water temperature Tc and brake cooling oil temperature Tb are intermediate temperatures between the lowest temperatures and highest temperatures, the line LNmid1 located between the minimum line LNmin and maximum line LNmax is set as the line LN1 of the first target rotation speed. When there is a different in temperature between the engine cooling water temperature Tc and brake cooling oil temperature Tb, the line LN1 of the first target rotation speed is set correspondingly to the highest of the two temperatures. The line LN1 of the first target rotation speed (for example, the intermediate line LNmid1) is thus determined correspondingly to the engine cooling water temperature Tc and brake cooling oil temperature Tb, and the rotation speed N of the hydraulically driven cooling fan 32 is regulated so as to obtain the first target rotation speed N1 that corresponds the present engine revolution speed Ne1 on the first target rotation speed line LN1 (LNmid1).

By contrast, the control during brake operation is a control performed on condition that at least the retarder control brake 14 has been operated. In the control during brake operation, a target rotation speed N2 (referred to herein as a second target rotation speed) of the hydraulically driven cooling fan 32 is determined by the brake operation amount Sb, this second target rotation speed N2 is compared with the first target rotation speed N1 determined in the above-described normal control, and the rotation speed N of the hydraulically driven cooling fan 32 is regulated to be equal to the target rotation speed that is the highest of the two.

In the control during brake operation, similarly to the normal control, the target rotation speed of the hydraulically driven cooling fan 32 varies within a region located between the maximum line LNmax and minimum line LNmin.

In the control during brake operation, a target line LN2 is set within this region so as to be a line with a higher target rotation speed as the brake operation amount Sb increases. When the brake operation amount Sb is the maximum operation amount, the maximum line LNmax is set as the line LN2 of the second target rotation speed. When the brake operation amount Sb is the intermediate operation amount, an intermediate line LNmid2 located between the minimum line LNmin and maximum line LNmax is set as the line LN2 of the second target rotation speed. As described hereinabove, the line LN1 (for example, the line LNmid1) of the first target rotation speed is set correspondingly to the engine cooling water temperature Tc and brake cooling oil temperature Tb. Accordingly, the line LN1 (LNmid1) of the first target rotation speed is compared with the line LN2 (LNmid2) of the second target rotation speed, and the line with the higher target rotation speed is selected. In a case where the line LN2 (LNmid2) of the second target rotation speed is higher than the line LN1 (LNmid1) of the first target rotation speed, the rotation speed N of the hydraulically driven cooling fan 32 is regulated so as to obtain the target rotation speed N2 corresponding to the present engine revolution speed Ne2 on the line LN2 (LNmid2) of the second target rotation speed.

In the present embodiment, the target line LN2 is set so as to be a line with a higher target rotation speed as the brake operation amount Sb increases, but the correspondence relationship of the brake operation amount Sb and target rotation speed is not necessarily a proportional relationship and may be set at any correspondence relationship. For example, a correspondence relationship may be such that a large target rotation speed close to the maximum line LNmax is obtained even when the brake operation amount Sb is extremely small. Furthermore, the target rotation speed may be set correspondingly whether the brake has been operated (ON, OFF). For example, the correspondence relationship may be such that in a case where the operation of the retarder control lever 14 has been OFF, a small target rotation speed corresponding to the minimum line LNmin is set, but where the operation of the retarder control lever 14 is ON, a large target rotation speed on the maximum line LNmax is set.

The contents of control performed by the controller 60 will be explained below with reference also to the flowchart shown in FIG. 6. In the first embodiment, the control during brake operation is performed if a condition that the vehicle speed detection means 53 does not detects that the vehicle 1 stops is established, in addition to the condition of the retarder control lever 14 being operated.

First, it is determined whether the retarder control lever 14 has been operated, on the basis of the detection signal Sb of the brake operation amount sensor 56 (step 101). In a case where the determination result indicates that the retarder control lever 14 has not been operated (determination NO in step 101), it is determined that the rear brake 5 has not been actuated and that the rear brake 5 cannot be overheated, so the normal control is executed. Thus, the line LN1 (for example, the intermediate line LNmid1) of the first target rotation speed is set correspondingly to the engine cooling water temperature Tc and brake cooling oil temperature Tb, and the rotation speed N of the hydraulically driven cooling fan 32 is regulated so as to obtain the first target rotation speed N1 corresponding to the present engine revolution speed Ne1 on the first target rotation speed line LN1 (LNmid1) (step 103).

In a case where it is determined that the retarder control lever 14 has been operated (determination YES in step 101), the vehicle 1 is determined (detected) to have stopped on the basis of the detection signals of the vehicle stop detection means 53 (parking switch 20, vehicle speed sensor 54, and shift position sensor 55) (step 102). As a result, in a case where the vehicle 1 is determined (detected) to have stopped, (determination YES in step 102), because the rear brake 5 has been actuated while the vehicle 1 is in a stopping condition, it is determined that the rear brake 5 cannot be overheated and the above-described normal control is executed (step 103).

By contrast, in a case where the vehicle 1 is not determined (detected) to have stopped (determination NO in step 102), because the rear brake 5 has been actuated while the vehicle 1 was traveling (other than the stopping condition), it is determined that the rear brake 5 can be overheated and the control during brake operation is executed. Thus, the line LN2 (for example, the line LNmid2) of the second target rotation speed is set correspondingly to the brake operation amount Sb. The line LN1 (for example, line LNmid1) of the first target rotation speed is set correspondingly to the engine cooling water temperature Tc and brake cooling oil temperature Tb. Accordingly, the line LN1 (LNmid1) of the first target rotation speed is compared with the line LN2 (LNmid2) of the second target rotation speed, and the line with the higher target rotation speed is selected. In a case where the line LN2 (LNmid2) of the second target rotation speed is higher than the line LN1 (LNmid1) of the first target rotation speed, the rotation speed N of the hydraulically driven cooling fan 32 is regulated so as to obtain the target rotation speed N2 corresponding to the present engine revolution speed Ne2 on the line LN2 (LNmid2) of the second target rotation speed (step 104).

Thus, in a case where the retarder control lever 14 is operated and the second target rotation speed N2 corresponding to the brake operation amount Sb of the retarder control brake exceeds the first target rotation speed N1 corresponding to the brake cooling oil temperature and the like, it is determined that the brake cooling capacity will have to be increased because the cooling oil temperature rises, and the rotation speed N of the hydraulically driven cooling fan 32 is regulated to the second target rotation speed N2 corresponding to the brake operation amount Sb.

By contrast where the retarder control brake 14 has been operated, but the second target rotation speed N2 corresponding to the brake operation amount Sb of the retarder control brake is still below the first target rotation speed N1 corresponding to the detected cooling oil temperature Tb and the like, it is determined that the cooling oil temperature has already risen and the brake capacity has sufficiently increased, and the rotation speed N of the hydraulically driven cooling fan 32 is regulated to the first target rotation speed N1 corresponding to the present detected cooling oil temperature Tb and the like.

According to the first embodiment, a state in which the brake cooling capacity has to be increased is determined at a point of time the retarder control brake 14 is operated, and the brake cooling capacity can be increased in advance, before the brake cooling oil temperature Tb actually rises. Therefore, there is practically no time lag between when the retarder control brake 14 is operated and when the rotation speed of the hydraulically driven cooling fan 32 actually increases and the cooling capacity actually rises. As a result, an event in which the cooling oil is overheated can be avoided and an event in which rear brake 5 is damaged can be avoided.

Furthermore, because the brake cooling efficiency is increased, it is possible to reduce the capacity of oil cooler 30 and hydraulic pump 42 that constitute the cooling circuit of the rear brake 5. As a result, a compact cooling circuit of the rear brake 5 can be designed and the degree of freedom in designing the layout of the brake cooling circuit is increased.

The above-described first embodiment is assumed to be applied to the vehicle 1 in which, as shown in FIG. 1, the power of engine 2 is distributed to the travel power train 3 and hydraulic pump 40 (41, 42, 43 . . . ), the drive wheels 12 are actuated via the travel power train 3 and the hydraulically driven cooling fan 32 is actuated via the hydraulic pump 40 (hydraulic pump 43).

For example, the retarder brake is almost exclusively actuated during downhill movement or deceleration of the vehicle 1 such as a dump truck. During downhill movement or deceleration, a drive torque is inputted from the drive wheels 12 to the engine 2 via the travel power train 3 and the engine 2 is rotated. Therefore, the energy used for raising the rotation speed N of the hydraulically driven cooling fan 32 to the second target rotation speed N2 is consumed as the energy inputted from the drive wheels 12. As a result, energy efficiency can be increased and fuel consumption is not affected despite the increase in cooling capacity of the rear brake 5 and increase in retarder capacity.

Furthermore, in the first embodiment, the vehicle stop detection means 53 for detecting that the vehicle 1 has stopped is provided; the control during brake operation is performed on condition that the vehicle 1 is not detected to have stopped; and the rotation speed N of the hydraulically driven cooling fan 32 is controlled so as to obtain the higher target rotation speed of the first target rotation speed N1 and second target rotation speed N2.

Most of a state in which the oil-cooled rear brake 5 is overheated and cooling capacity has to be increased occurs at a time when the vehicle 1 travels, while the rear brake 5 is actuated. For example, even if the brake operation amount Sb is large, but the vehicle 1 is stopped, the oil-cooled rear brake 5 will not overheat and no need to increase cooling capacity. Furthermore, the operator sometimes operates the retarder control lever 14, while the vehicle 1 is stopped. Conversely, where the control is performed in this state so as to increase the rotation speed N of the hydraulically driven cooling fan 32 to the second target rotation speed N2, the hydraulically driven cooling fan 32 is unnecessarily driven, resulting in the increased fuel consumption.

In the first embodiment, even if the retarder control lever 14 has been operated, if the vehicle 1 is stopped, the normal control is performed without performing the control during brake operation, and the hydraulically driven cooling fan 32 is not driven unnecessarily. As a result, the increase in fuel consumption can be inhibited.

Various modifications can be added to the above-described first embodiment, and it may also be possible to employ modification examples in which device components are removed or added.

In the first embodiment a water-cooled oil cooler 30 is assumed, but an air-cooled oil cooler that is directly cooled by the hydraulically driven cooling fan 32 may also be employed.

Furthermore, in the first embodiment, the normal control sets the first target rotation speed N1 correspondingly to the engine cooling water temperature Tc, brake cooling oil temperature Tb, and engine revolution speed Ne. However, it is possible to omit sensors for detecting the engine cooling water temperature Tc and engine rotation speed Ne appropriately, if the first target rotation speed N1 is set correspondingly to at least the brake cooling oil temperature Tb.

In the first embodiment, the control during brake operation is performed if a condition that the vehicle speed detection means 53 does not detect that the vehicle 1 has stopped is established, in addition to the condition that the retarder control brake 14 has been operated, but the control during brake operation may be also performed based only on the condition that the retarder control lever 14 has been operated. In this case, in the flowchart shown in FIG. 6, the vehicle stop detection (determination) processing of step 102 is omitted and the control during brake operation (step 104) or normal control (step 103) is executed correspondingly to whether the retarder control lever 14 has been operated (step 101).

In the above-described embodiment, the second target rotation speed N2 corresponding to the present brake operation amount Sb is directly set by the second target rotation speed setting means 62. However, it may also be possible to find an estimated oil temperature increase width ΔTb of the brake cooling oil temperature Tb corresponding to the present brake operation amount Sb and set the second target rotation speed N2 on the basis of the estimated oil temperature increase width Δn.

FIG. 11 is a functional block diagram of the controller 60.

The detection signal Ne of the engine revolution speed sensor 50 and the detection signal Tc of the engine cooling water temperature sensor 51 are inputted in the first target rotation speed setting means 61 of the controller 60, and the first target rotation speed N1 of the fan 32 for cooling is set. Thus, the first target rotation speed N1 corresponding to the present engine revolution speed N and engine cooling water temperature Tc is set.

The detection signal Ne of the engine revolution speed sensor 50, detection signal Tb of the brake cooling oil temperature sensor 52, and detection signal Sb of the brake operation amount sensor 56 are inputted in the second target rotation speed setting means 62 of the controller 60, and the second target rotation speed N2 of the fan 32 for cooling is set. Thus, the estimated oil temperature increase width ΔTb of the brake cooling oil temperature Tb corresponding to the present engine revolution speed Ne and, present brake operation amount Sb is computed. Then, an estimated oil temperature Tb+ΔTb is found by adding up the estimated oil temperature increase width ΔTb and present brake cooling oil temperature Tb, and the second target rotation speed N2 corresponding to the estimated oil temperature Tb+ΔTb and present engine revolution speed Ne is set.

The detection signal Sb of the brake operation amount sensor 56, detection signal of the vehicle stop detection means 53, set target rotation speed N1 of the first target rotation speed setting means 61, and set target rotation speed N2 of the second target rotation speed setting means 62 are inputted in the rotation speed control means 63 of the controller 60; an electric control signal for performing the normal control or an electric control signal for performing the control during brake operation is generated; and the generated electric control signal is outputted to the swash plate drive unit 34. Thus, in a case where the brake has not been operated or the vehicle has been stopped, the normal control is executed and the rotation speed N of the hydraulically driven cooling fan 32 is regulated so as to obtain the first target rotation speed N1. Furthermore, in a case where the brake has been operated and the vehicle has not been stopped, the control during brake operation is executed and the rotation speed N of the hydraulically driven cooling fan 32 is regulated so as to obtain the higher target rotation speed of the first target rotation speed N1 and second target rotation speed N2.

In the above-described embodiment, the second target rotation speed N2 corresponding to the present brake operation amount Sb is directly set by the second target rotation speed setting means 62. However, it may also be possible to find the necessary fan rotation speed increase width ΔN of the rotation speed N of the hydraulically driven cooling fan 32 that corresponds to the present brake operation amount Sb, and set the second target rotation speed N2 on the basis of the necessary fan rotation speed increase width ΔN.

FIG. 12 is a functional block diagram of the controller 60.

The detection signal Ne of the engine revolution speed sensor 50 and the detection signal Tc of the engine cooling water temperature sensor 51 are inputted in the first target rotation speed setting means 61 of the controller 60, and the first target rotation speed N1 of the fan 32 for cooling is set. Thus, the first target rotation speed N1 corresponding to the present engine revolution speed Ne and present engine cooling water temperature Tc is set.

The detection signal Ne of the engine revolution speed sensor 50, detection signal Tb of the brake cooling oil temperature sensor 52, and detection signal Sb of the brake operation amount sensor 56 are inputted in the second target rotation speed setting means 62 of the controller 60, and the second target rotation speed N2 of the fan 32 for cooling is set. Thus, the necessary fan rotation speed increase width ΔN of the rotation speed N of the hydraulically driven cooling fan 32 that corresponds to the present engine revolution speed Ne and present brake operation amount Sb is computed. Then, a fan target rotation speed Nb corresponding to the present engine revolution speed Ne and present brake cooling oil temperature Tb is computed. The second target rotation speed N2 (=Nb+ΔN) is set by adding up the necessary fan rotation speed increase width ΔN and fan target rotation speed Nb.

The detection signal Sb of the brake operation amount sensor 56, detection signal of the vehicle stop detection means 53, set target rotation speed N1 of the first target rotation speed setting means 61, and set target rotation speed N2 of the second target rotation speed setting means 62 are inputted in the rotation speed control means 63 of the controller 60; an electric control signal for performing the normal control or an electric control signal for performing the control during brake operation is generated; and the generated electric control signal is outputted to the swash plate drive unit 34. Thus, in a case where the brake has not been operated or the vehicle has stopped, the normal control is executed and the rotation speed N of the hydraulically driven cooling fan 32 is regulated so as to obtain the first target rotation speed N1. Furthermore, in a case where the brake has been operated and the vehicle has not been stopped, the control during brake operation is executed and the rotation speed N of the hydraulically driven cooling fan 32 is regulated so as to obtain the higher target rotation speed of the first target rotation speed N1 and second target rotation speed N2.

In the above-described embodiment, a state in which the brake cooling capacity has to be increased is determined and the control during brake operation is performed on the basis of operation of the retarder control lever 14.

However, instead of detecting that the brake has been actually operated, it may also be possible to assume that "the brake has been operated" by detecting a state in which the brake operation is necessary, namely, a downhill movement, and perform the control during brake operation.

In this case, an inclination angle detection means for detecting a descent gradient θ (an inclination angle of the vehicle or an inclination angle of the road) is used instead of the "brake operation amount detection means 56." Furthermore, the second target rotation speed N2 corresponding to the descent gradient θ is set instead of the second target rotation speed N2 corresponding to brake operation amount Sb. The brake is assumed to be operated by a larger operation amount as the descent gradient θ increases. Accordingly a larger value of the second target rotation speed N2 is set.

In the above-described embodiment, the second target rotation speed N2 is set uniformly, regardless of whether the vehicle 1 is empty or loaded. However, it may also be possible to vary the value of the second target rotation speed N2 depending on whether the vehicle 1 is empty or loaded.

For example, the vehicle weight is larger in a loaded state where a load is present in a vessel of the dump truck than in a case where the vehicle 1 is empty and no load is present in the vessel of the dump truck. Since the weight is larger, the amount of heat generated by a brake operation increases and the increase in the rotation speed of the hydraulically driven cooling fan 32 has to be larger. Therefore, the second target rotation speed N2 is set such that the second target rotation speed N2 that is set in a case where the vehicle 1 is loaded is higher than the second target rotation speed N2 that is set in a case where the vehicle 1 is empty. Whether the vehicle 1 is empty or loaded can be determined, for example, on the basis of a detected value of a cylinder internal pressure sensor provided in a suspension cylinder. It may also be possible to detect the weight of the vehicle 1 and set the second target rotation speed N2 such that the second target rotation speed N2 rises with the increase in the value of the detected weight.

FIG. 13 is a functional block diagram of the controller 60.

The detection signal Ne of the engine rotation speed sensor 50, detection signal Tc of the engine cooling water temperature sensor 51, and detection signal Tb of the brake cooling oil temperature sensor 52 are inputted in the first target rotation speed setting means 61 of the controller 60, and the first target rotation speed N1 of the cooling fan 32 is set.

Thus, the first target rotation speed N1 corresponding to the present engine rotation speed Ne, present engine cooling water temperature Tc, and present brake cooling oil temperature Tb is set.

The detection signal Ne of the engine rotation speed sensor 50, detection signal 9 of the inclination angle detection means 58, and a detection signal of a cylinder internal pressure sensor 59 are inputted in the second target rotation speed setting means 62 of the controller 60, and the second target rotation speed N2 of the cooling fan 32 is set. Thus, the second target rotation speed N2 corresponding to the present engine rotation speed Ne, present descent gradient θ, and present vehicle weight ("empty state" or "loaded state") is set. FIG. 14 shows a correspondence relationship between the descent gradient θ, vehicle weight ("empty state" or "loaded state"), and second target rotation speed N2. Thus, a larger value of the second target rotation speed N2 is set when the descent gradient θ is larger and also when the vehicle is loaded.

The detection signal θ of the inclination angle detection means 58, detection signal of the vehicle stop detection means 53, set target rotation speed N1 of the first target rotation speed setting means 61, and set target rotation speed N2 of the second target rotation speed setting means 62 are inputted in the rotation speed control means 63 of the controller 60; an electric control signal for performing the normal control or an electric control signal for performing the control during brake operation is generated; and the generated electric control signal is outputted to the swash plate drive unit 34. Thus, in a case where the vehicle 1 does not move downhill (no descent gradient), the normal control is executed and the rotation speed N of the hydraulically driven cooling fan 32 is regulated so as to obtain the first target rotation speed N1. In a case where the vehicle 1 moves downhill, the control during brake operation is executed and the rotation speed N of the hydraulically driven cooling fan 32 is regulated so as to obtain the higher target rotation speed of the first target rotation speed N1 and second target rotation speed N2.

Control According to the Second Embodiment

The second embodiment is an embodiment implemented by using the device configuration shown in FIG. 7 instead of that shown in FIG. 4.

The detection signal Ne of the engine revolution speed sensor 50, detection signal Tc of the engine cooling water temperature sensor 51, and detection signal Tb of the brake cooling oil temperature sensor 52 are inputted in the first target rotation speed setting means 61 of the controller 60, and the first target rotation speed N1 of the fan 32 for cooling is set. The detection signal Ne of the engine revolution speed sensor 50 and the detection signal Sb' of the brake operation amount sensor 57 are inputted in the second target rotation speed setting means 62 of the controller 60, and the second target rotation speed N2 of the fan 32 for cooling is set. The detection signal Sb' of the brake operation amount sensor 57, detection signal of the vehicle stop detection means 53, set target rotation speed N1 of the first target rotation speed setting means 61, and set target rotation speed N2 of the second target rotation speed setting means 62 are inputted in the rotation speed control means 63 of the controller 60; an electric control signal for performing a normal control or an electric control signal for performing a control during brake operation is generated; and the electric control signal is outputted to the swash plate drive unit 34.

As shown in FIG. 7, in the second embodiment, the brake operation amount sensor 57 that detects the operation amount Sb' of the pedal 4 for actuating the foot brake is provided instead of the sensor 56 that detects the operation amount Sb of the retarder control lever 14; the second target rotation speed N2 is set correspondingly to the detection signal Sb' of the brake operation amount sensor 57; and the control during brake operation is performed. Thus, the control is performed in the same manner as in the first embodiment by replacing "the operation amount Sb of the retarder control lever 14" in the description of the first embodiment with "the operation amount Sb' of the pedal 4".

The second embodiment can be advantageously applied to the vehicle 1 in which the retarder control lever 14 is not provided (retarder brake is not provided), or in which the retarder control lever 14 is provided (retarder brake is provided) but overheating of the rear brake 5 that accompanies the actuation of the foot brake is a more significant problem.

In the second embodiment, it may also be possible to employ an air-cooled oil cooler instead of the water-cooled oil cooler 30, in the same manner as in the first embodiment.

In the second embodiment, it is possible to omit sensors for detecting the engine cooling water temperature Tc and engine rotation speed Ne appropriately, if the first target rotation speed N1 is set correspondingly to at least the brake cooling oil temperature Tb.

In the second embodiment, the control during brake operation may also be carried out only on the condition that the pedal 4 has been operated. In this case, in the flowchart shown in FIG. 6, the processing of vehicle stop detection (determination) of step 102 is omitted and the control during brake operation (step 104) or normal control (step 103) is executed correspondingly to whether the pedal 4 has been operated (step 101).

Furthermore, in the second embodiment, the control similar to that explained with reference to FIG. 11, FIG. 12, FIG. 13, and FIG. 14 in the first embodiment may also be implemented.

Control According to the Third Embodiment

The third embodiment is an embodiment implemented by using the device configuration shown in FIG. 8 instead of that shown in FIG. 4.

The detection signal Ne of the engine revolution speed sensor 50, detection signal Tc of the engine cooling water temperature sensor 51, and detection signal Tb of the brake cooling oil temperature sensor 52 are inputted in the first target rotation speed setting means 61 of the controller 60, and the first target rotation speed N1 of the fan 32 for cooling is set. The detection signal Ne of the engine revolution speed sensor 50, detection signal Sb of the brake operation amount sensor 56, and the detection signal Sb' of the brake operation amount sensor 57 are inputted in the second target rotation speed setting means 62 of the controller 60, and the second target rotation speed N2 of the fan 32 for cooling is set. The detection signal Sb of the brake operation amount sensor 56, detection signal Sb' of the brake operation amount sensor 57, detection signal of the vehicle stop detection means 53, set target rotation speed N1 of the first target rotation speed setting means 61, and set target rotation speed N2 of the second target rotation speed setting means 62 are inputted in the rotation speed control means 63 of the controller 60; an electric control signal for performing the normal control or an electric control signal for performing the control during brake operation is generated; and the generated electric control signal is outputted to the swash plate drive unit 34.

As shown in FIG. 8, in the third embodiment, the brake operation amount sensor 57 that detects the operation amount Sb' of the pedal 4 for actuating the foot brake is provided in addition to the sensor 56 that detects the operation amount Sb of the retarder control lever 14; the second target rotation speed N2 is found correspondingly to the detection signal Sb of the brake operation amount sensor 56 and detection signal Sb' of the brake operation amount sensor 57; and the control during brake operation is performed. Thus, the control is performed in the same manner as in the first embodiment by replacing "the operation amount Sb of the retarder control lever 14" in the description of the first embodiment with "the operation amount Sb of the retarder control lever 14 and the operation amount Sb' of the pedal 4". For example, the second, target rotation speed N2 is set correspondingly to the higher operation amount of the operation amount Sb of the retarder control lever 14 and the operation amount Sb' of the pedal 4. Furthermore, in step 101 shown in FIG. 6, it is determined whether either of the retarder control lever 14 or pedal 4 has been controlled.

The third embodiment can be advantageously applied to the vehicle 1 in which not only the overheating of the rear brake 5 that accompanies the actuation of the retarder brake, but also the overheating of the rear brake 5 that accompanies the actuation of the foot brake is a problem.

In the third embodiment, it may also be possible to employ an air-cooled oil cooler instead of the water-cooled oil cooler 30, in the same manner as in the first embodiment.

In the third embodiment, it is possible to omit sensors for detecting the engine cooling water temperature Tc and engine rotation speed Ne appropriately, if the first target rotation speed N1 is set correspondingly to at least the brake cooling oil temperature Tb.

In the third embodiment, the control during brake operation may also be carried out only on the condition that the retarder control lever 14 or the pedal 4 has been operated. In this case, in the flowchart shown in FIG. 6, the processing of vehicle stop detection (determination) of step 102 is omitted and the control during brake operation (step 104) or normal control (step 103) is executed correspondingly to whether or not retarder control lever 14 or the pedal 4 has been operated (step 101).

Furthermore, in the third embodiment, the control similar to that explained with reference to FIG. 11, FIG. 12, FIG. 13, and FIG. 14 in the first embodiment may also be implemented.

In the above-descried embodiment, the rotation speed N of the hydraulically driven cooling fan 32 is regulated by changing the capacity of the variable-displacement hydraulic pump 43 for driving a fan, but such a configuration is merely an example, and any hydraulic circuit for regulating the rotation speed N of the hydraulically driven cooling fan 32 may be designed. For example, as shown in FIG. 9, it may also be possible to provide an oil path 38 that bypasses the pressurized oil discharged from a fixed-displacement hydraulic pump 43' for driving a fan to the tank 37, provide a flow control valve 39 on the bypass oil path 38, apply an electric control signal from the controller 60 to the flow control valve 39, and actuate the flow control valve 39. Where the electric control signal is applied from the controller 60 to the flow control valve 39, the flow control valve 39 is actuated, and pressurized oil discharged from the hydraulic pump 43' for driving a fan is released into the tank 37 via the bypass oil path 38 correspondingly to the actuation position of the flow control valve 39. As a result, the flow rate of pressurized oil supplied from the hydraulic pump 43' for driving a fan to the hydraulic motor 33 for driving a fan is regulated, and the rotation speed N of the hydraulically driven cooling fan 32 is controlled to a target rotation speed.

In the explanation above, the hydraulically driven cooling fan 32 is assumed, but the present invention may also be applied to a cooling fan driven by a drive source other than a hydraulic drive source. For example, the present invention may also be applied to a case where the rotation speed of an electric cooling fan is controlled.

In the above-described embodiments, by using the control map shown in FIG. 5, the first target rotation speed N1 of the hydraulically driven cooling fan 32 is determined and the second target rotation speed N2 of the hydraulically driven cooling fan 32 is determined. However, the control map shown in FIG. 5 is merely an example and the present invention is not limited thereto. For example, the control map shown in FIG. 10 may also be employed.

FIG. 10 shows an example of another control map for finding the target rotation speed of the hydraulically driven cooling fan 32 on the basis of the engine revolution speed Ne, engine cooling water temperature Tc, brake cooling oil temperature Tb, and brake operation amount Sb. As shown in FIG. 10, each line represented by a broken line is set in advance so that a higher target rotation speed is obtained as the engine revolution speed Ne rises, also as the brake cooling oil temperature Tb rises as Tb1, Tb2, Tb3 . . . , also as the engine cooling water temperature Tc rises as Tc1, Tc2, Tc3 . . . , and as the brake operation amount Sb rises as Sb1, Sb2, Sb3 . . . . For example, where the fan target rotation speed is denoted by Nf, each line is set so that the fan target rotation speed Nf rises at a predetermined proportionality ratio k with respect to the engine revolution speed Ne, and can be represented by the following formula.

$$Nf = k \cdot Ne$$

The coefficient k in the formula above, that is, the inclination of the lines is determined by the engine cooling water temperature Tc, brake cooling oil temperature Tb, and brake operation amount Sb.

Because the lines shown by broken lines are set intermittently, the lines (shown by solid lines) that are present between the adjacent broken lines are calculated with method of interpolation.

As described above, a line LN1' of the first target rotation speed N1 and a line LN2' of the second target rotation speed N2 are found from the control map shown in FIG. 10, similarly to FIG. 5, and the fan target rotation speed is established on the basis of the higher (line LN2') of these lines.

In the above-described embodiment, the explanation is conducted under an assumption that the rear brake 5 is configured by a wet multiplate disk, but the present invention may also be applied to a vehicle in which the front brake 13 is also configured by a wet multiplate disk, in addition to the rear brake 5, and the front brake 13 is also actuated in addition to the rear brake 5 during the retarder brake actuation.

Furthermore, in the above-described embodiments, the explanation is conducted under an assumption that the oil cooler 30 is installed inside a lower tank of the radiator 19, but the oil cooler 30 may also be installed inside the circulation circuit for cooling water, separately from the radiator 19. Furthermore, an air-cooled oil cooler may be disposed opposite the cooling fan.

In the above-described embodiments, the control during brake operation is performed on condition that the retarder control lever 14 has been operated or on condition that either of the retarder control lever 14 and pedal 4 has been operated, but the "control during brake operation" may also be executed unconditionally, regardless of the condition that the brake operation has been performed. Thus, the "control during brake operation" may be performed unconditionally, instead of the "normal control" that is conventionally performed unconditionally.

Figure 1:
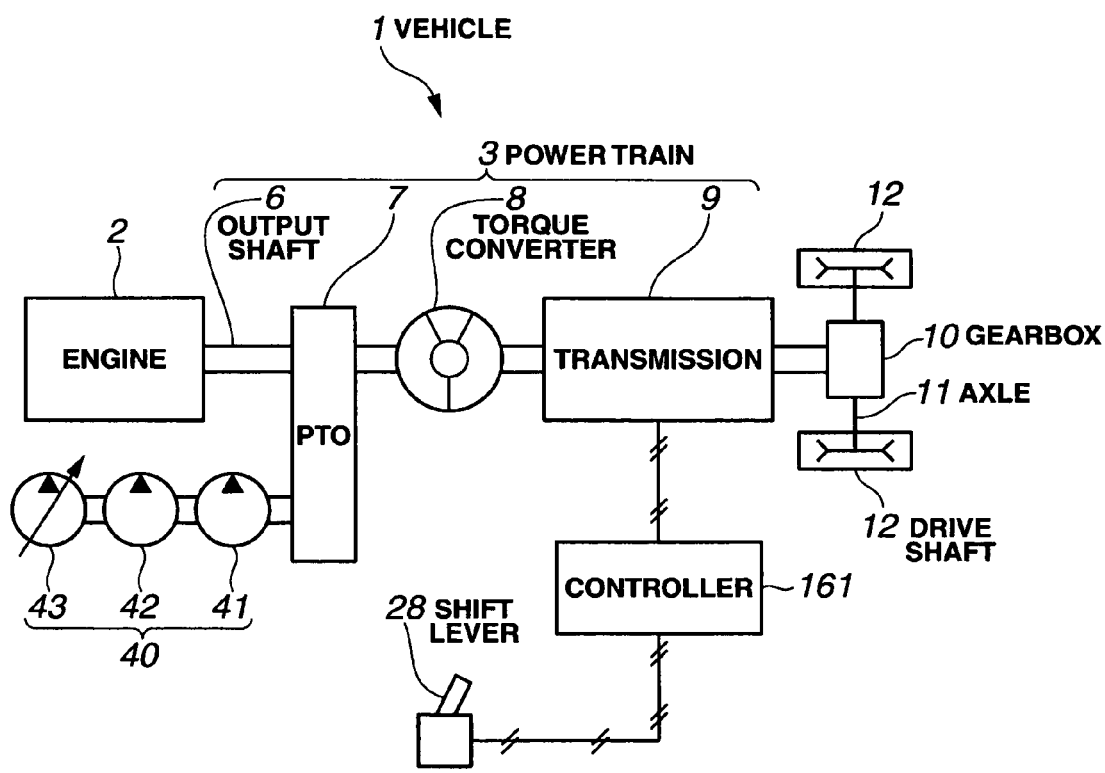
FIG. 1 is a block diagram illustrating the configuration of a travel power train of a vehicle of the embodiment, and the configuration of a dump truck is shown with respect to the components relating to the present invention.
Figure 2:
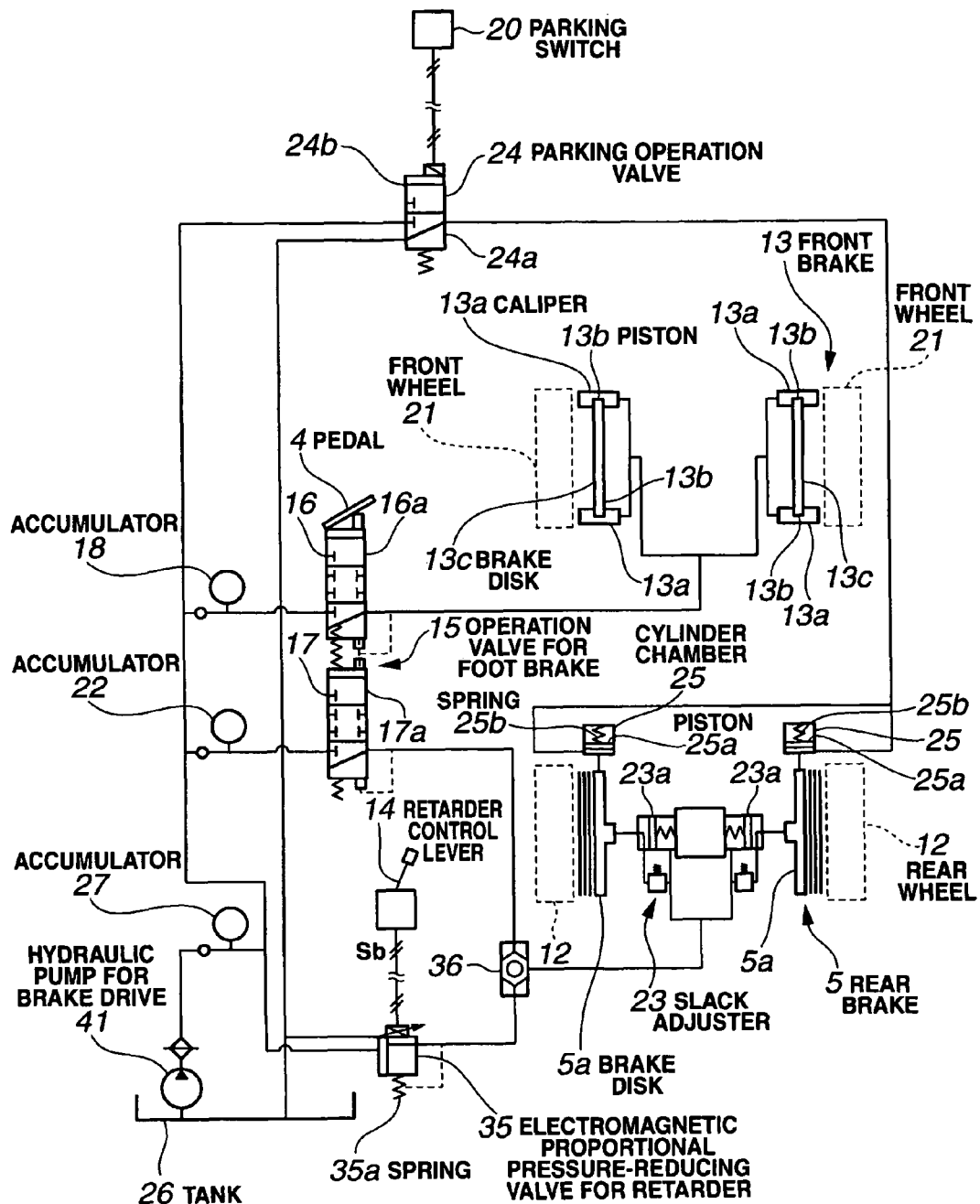
FIG. 2 is a hydraulic circuit diagram illustrating the configuration of a brake control device of the vehicle of the embodiment, and the configuration of a dump truck is shown with respect to the components relating to the present invention.
Figure 3:
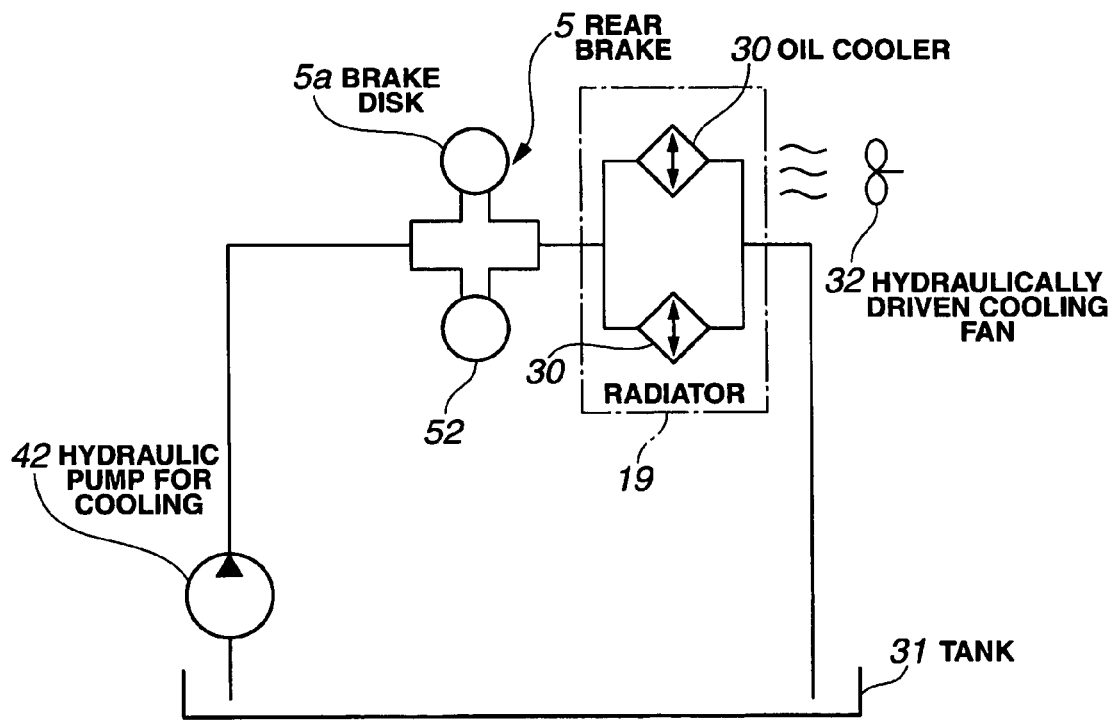
FIG. 3 is a hydraulic circuit diagram illustrating a cooling circuit of a rear brake with respect only to the components relating to the present invention.
Figure 4:
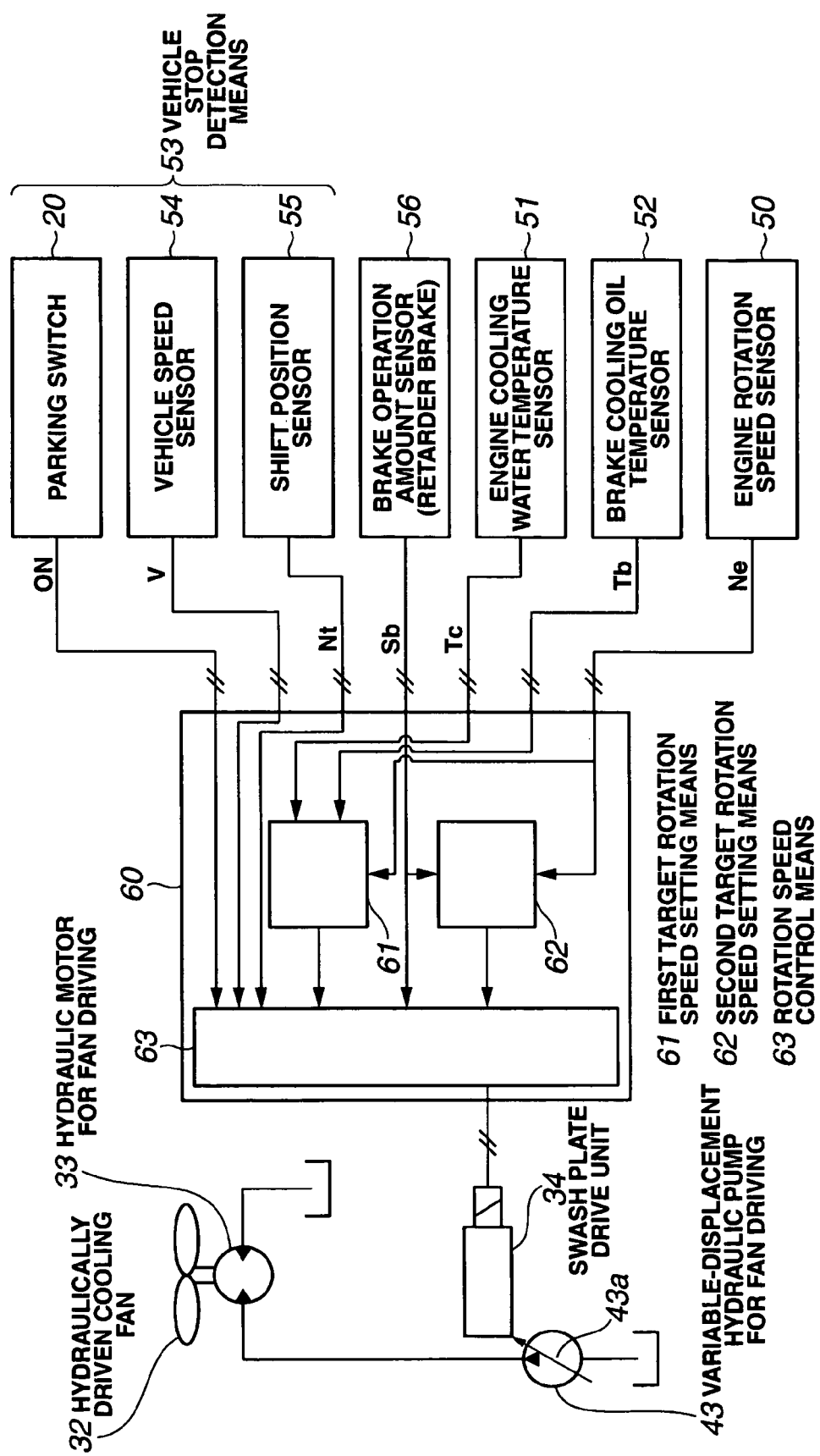
FIG. 4 shows a configuration example of the device for drive controlling a hydraulically driven cooling fan.
Figure 5:
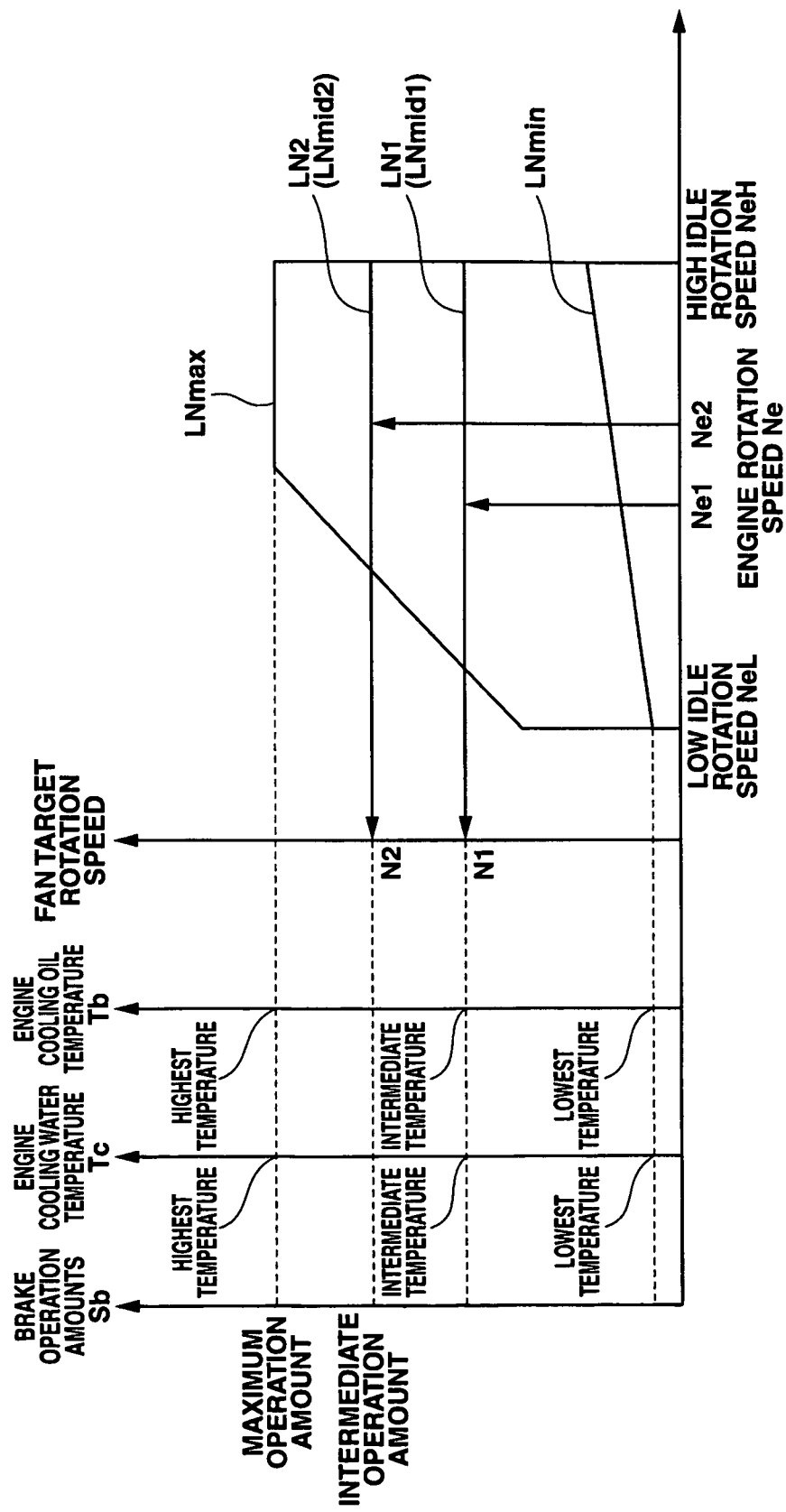
FIG. 5 is a control map diagram used for setting the first target rotation speed of the hydraulically driven cooling fan and setting the second target rotation speed of the hydraulically driven cooling fan.
Figure 6:
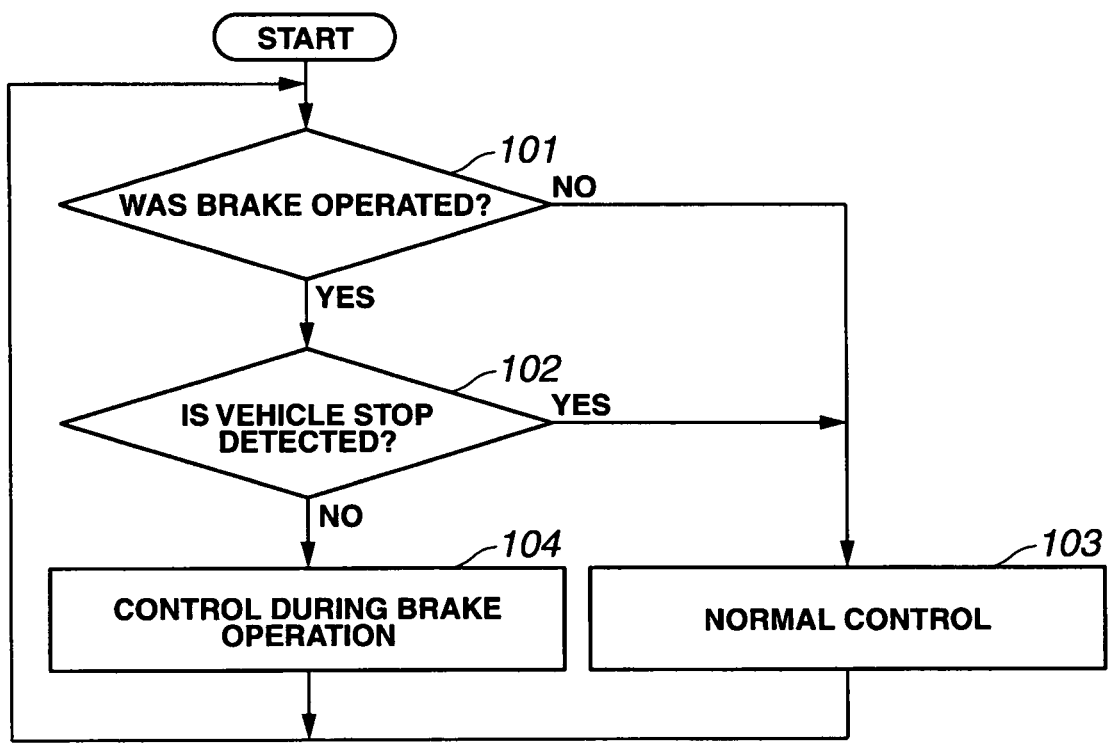
FIG. 6 is a flowchart illustrating the control processing sequence of the embodiment.
Figure 7:
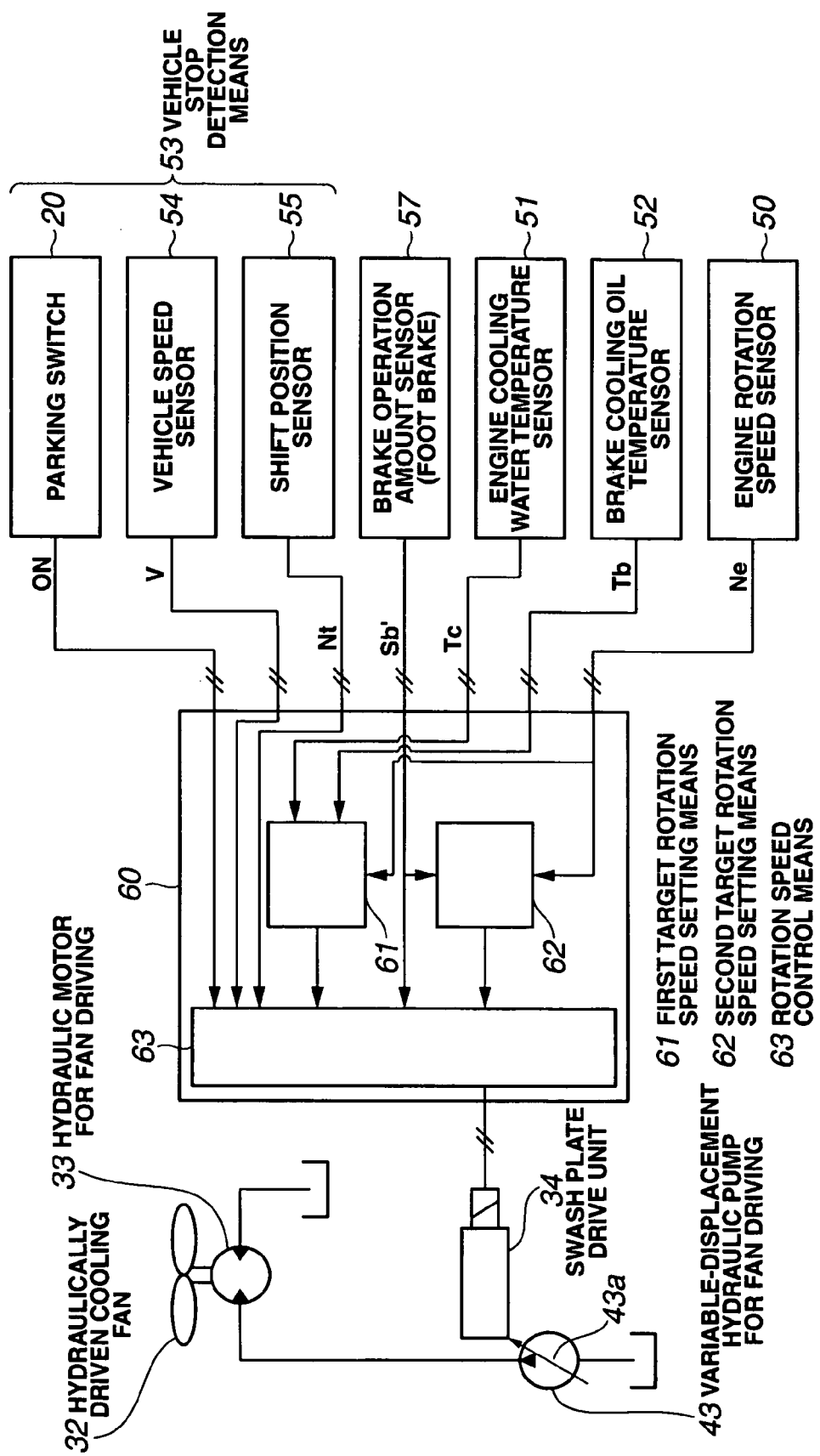
FIG. 7 shows another configuration example of the device for drive controlling a hydraulically driven cooling fan.
Figure 8:
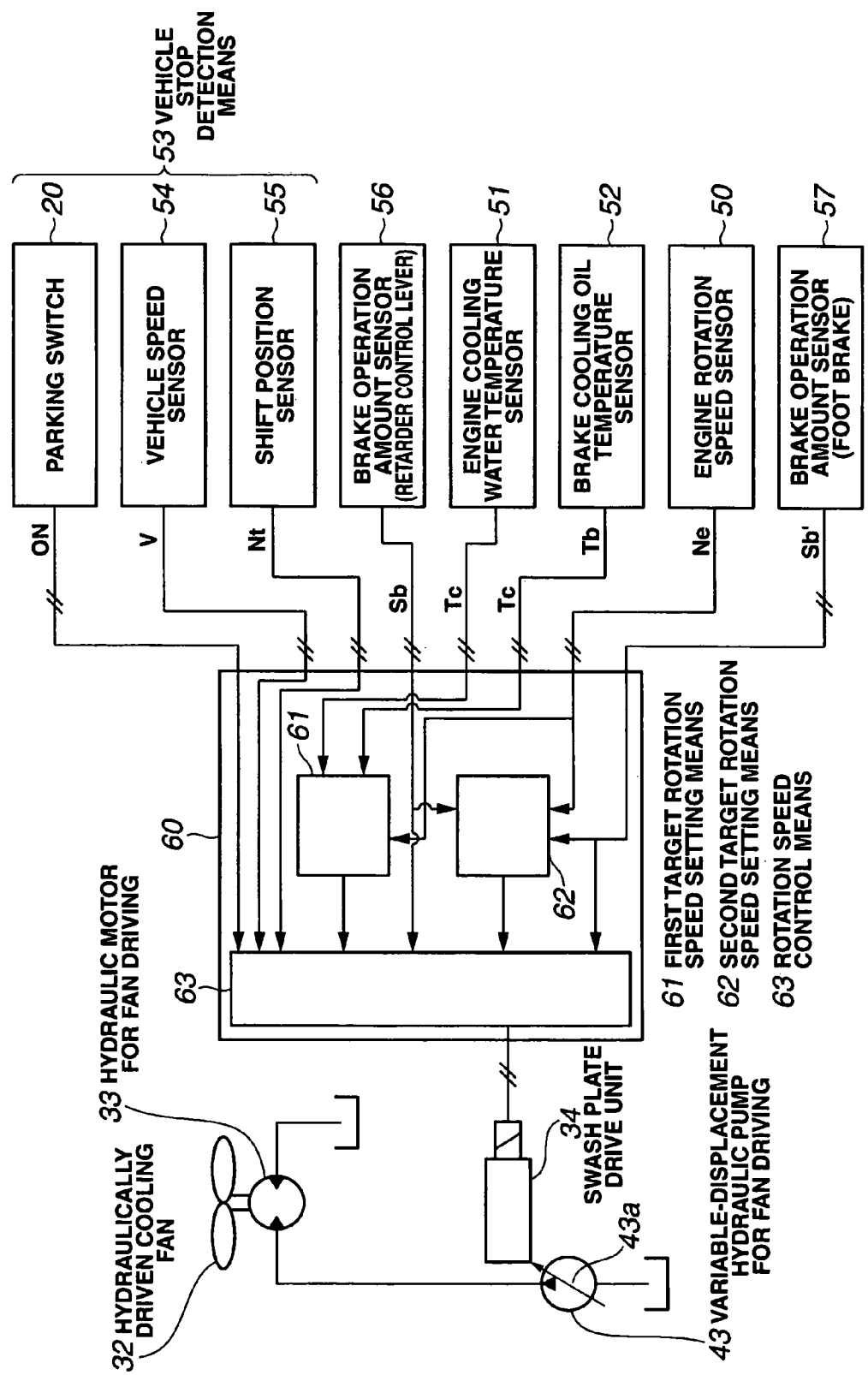
FIG. 8 shows yet another configuration example of the device for drive controlling a hydraulically driven cooling fan.
Figure 9:
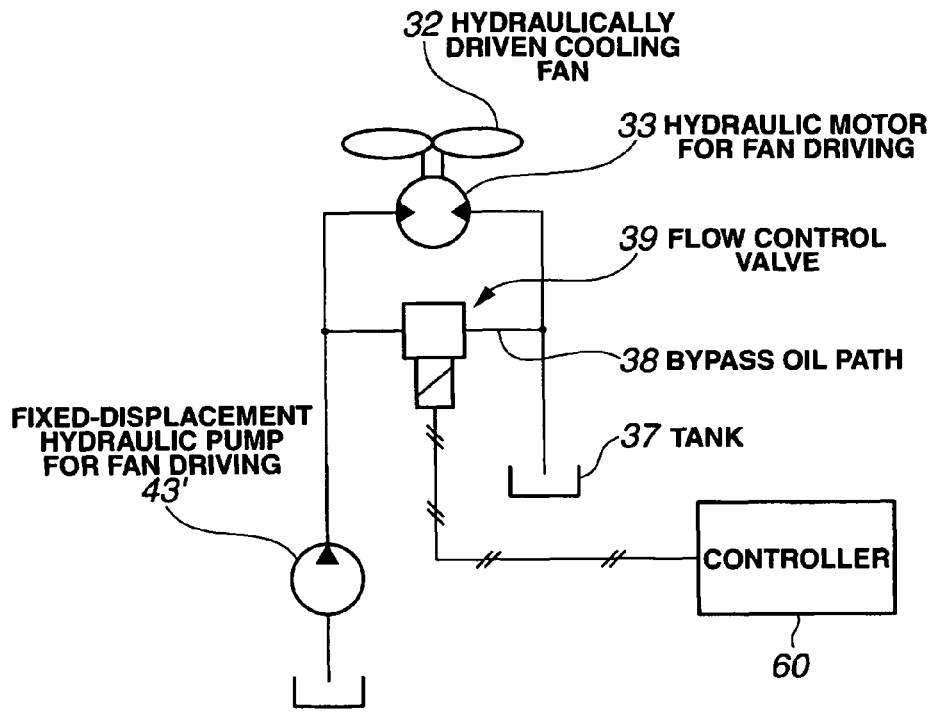
FIG. 9 is a hydraulic circuit diagram illustrating another example of hydraulic circuit for regulating the rotation speed of the hydraulically driven cooling fan.
Figure 10:
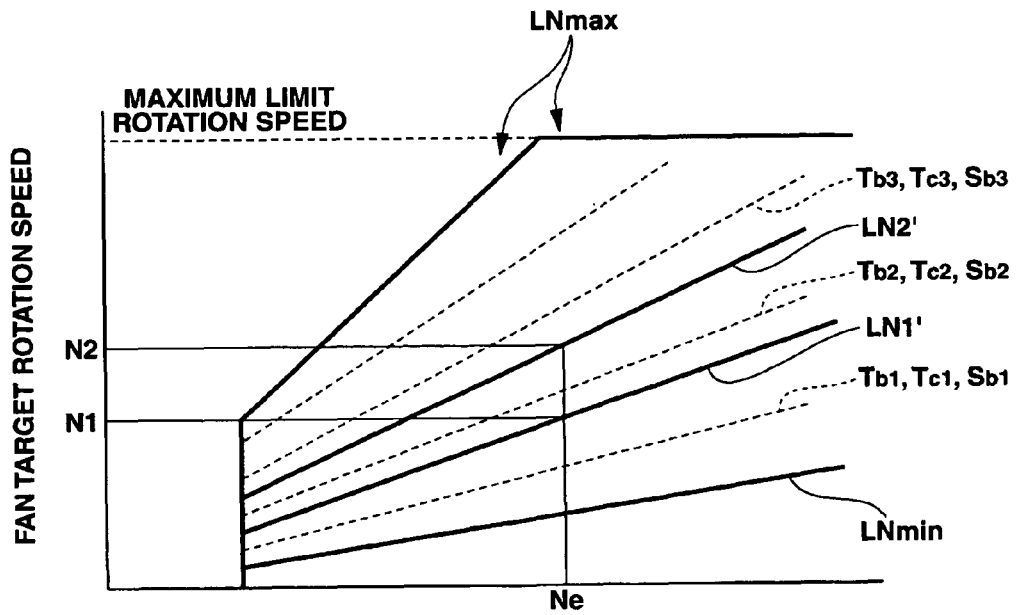
FIG. 10 shows an example of another control map for finding the target rotation speed of the hydraulically driven cooling fan on the basis of the engine revolution speed, engine cooling water temperature, brake cooling oil temperature, and brake operation amount.
Figure 11:
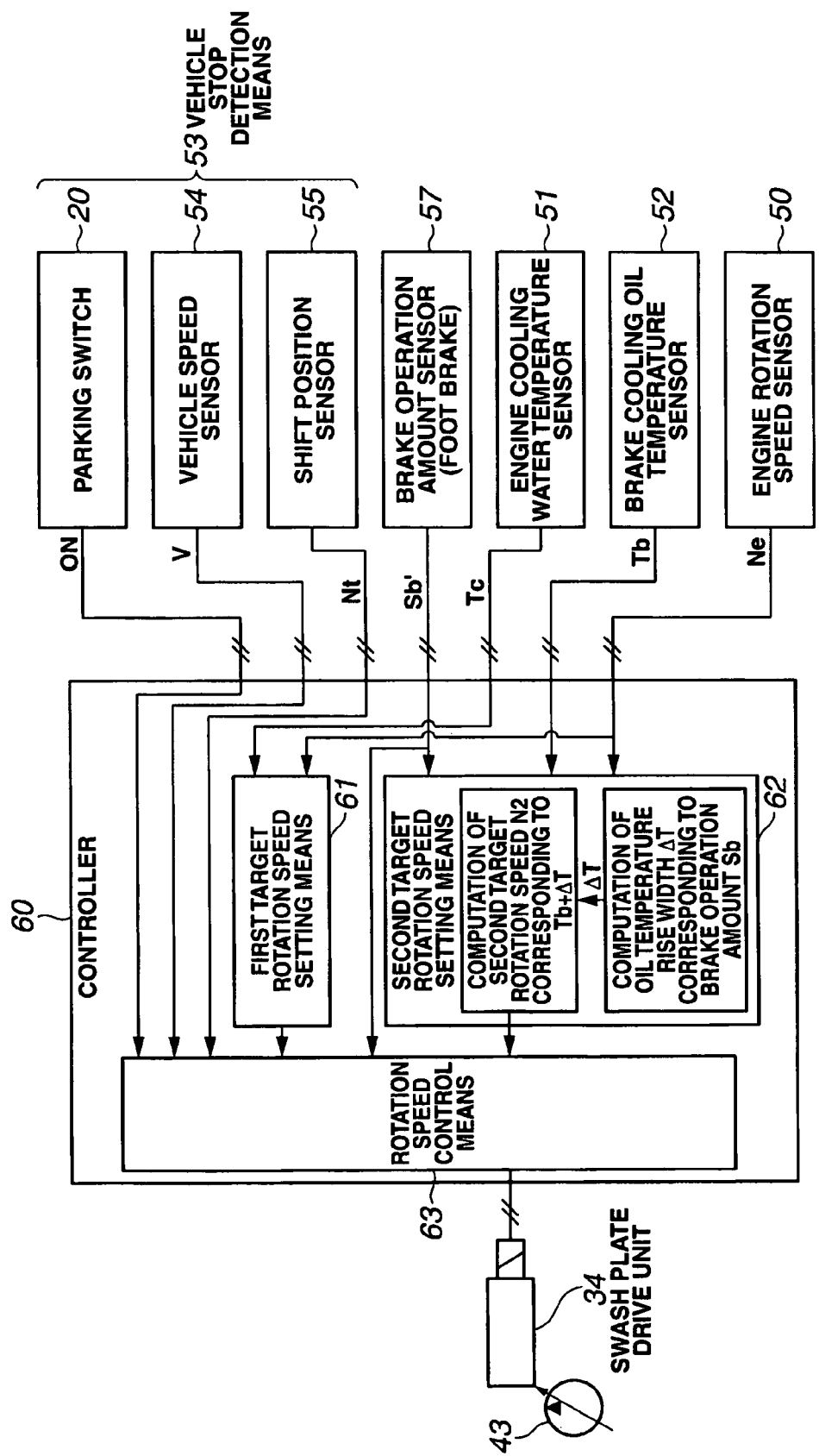
FIG. 11 is a functional block diagram of the controller.
Figure 12:
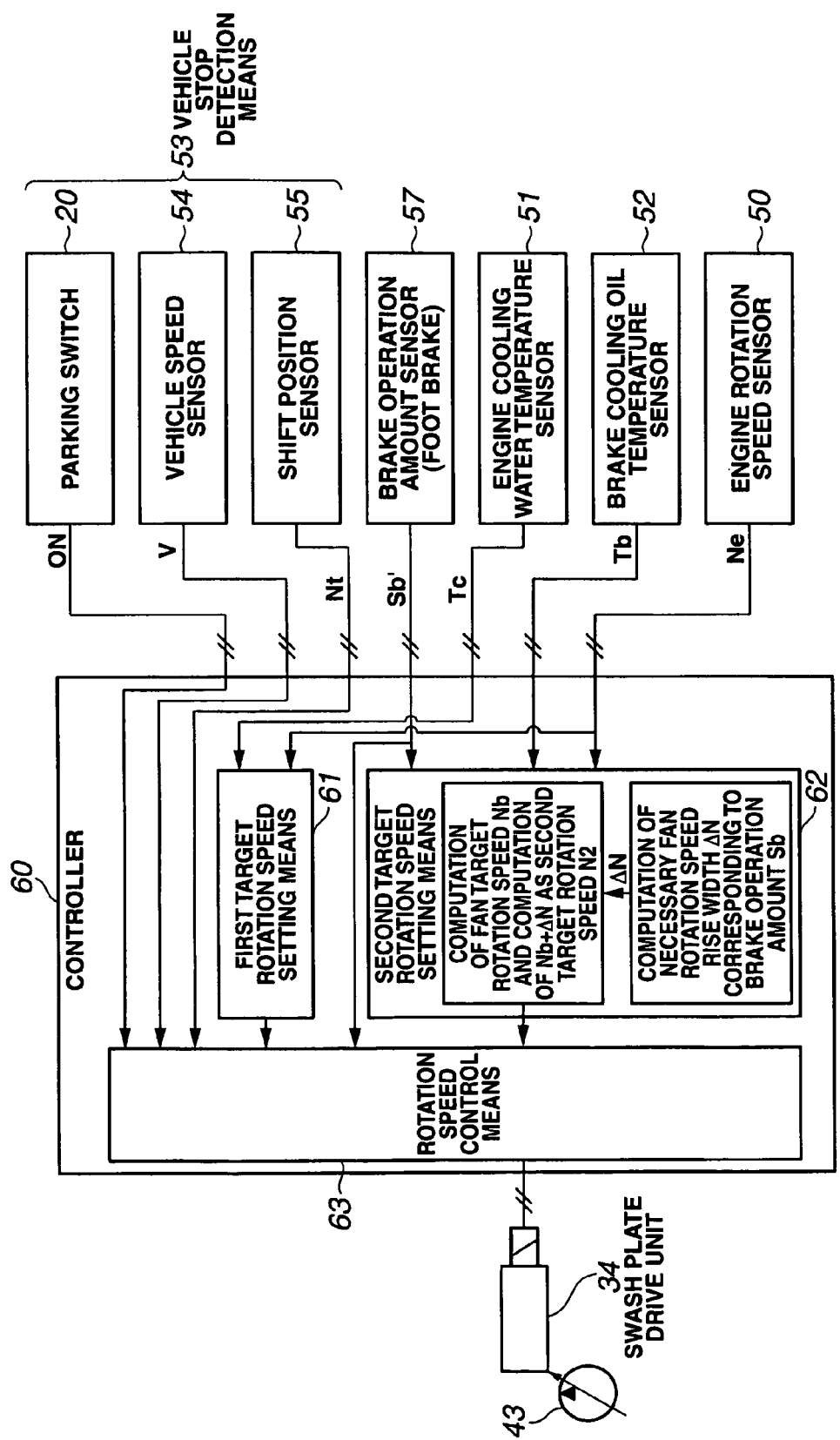
FIG. 12 is a functional block diagram of the controller.
Figure 13:
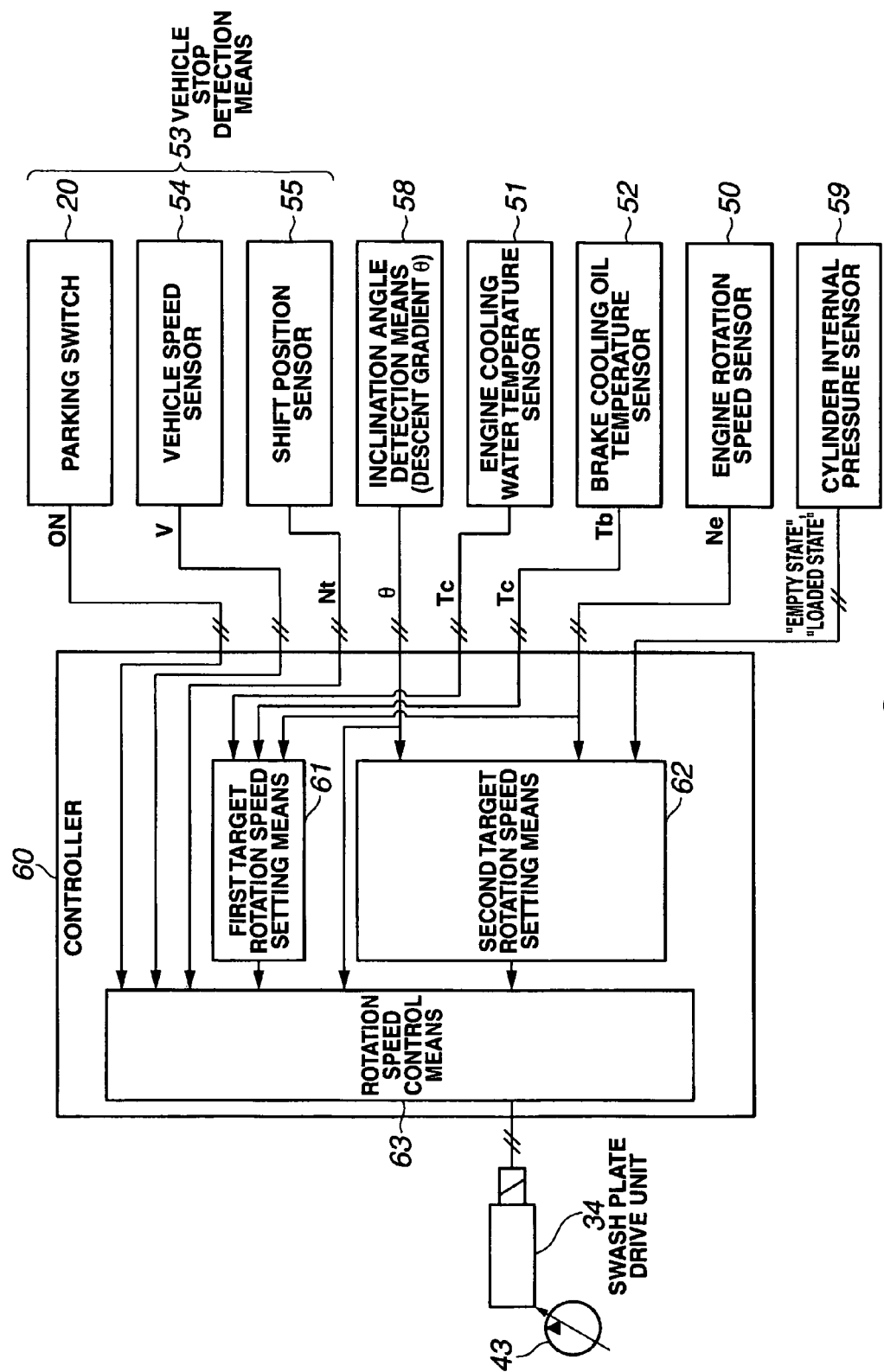
FIG. 13 is a functional block diagram of the controller.
Figure 14:
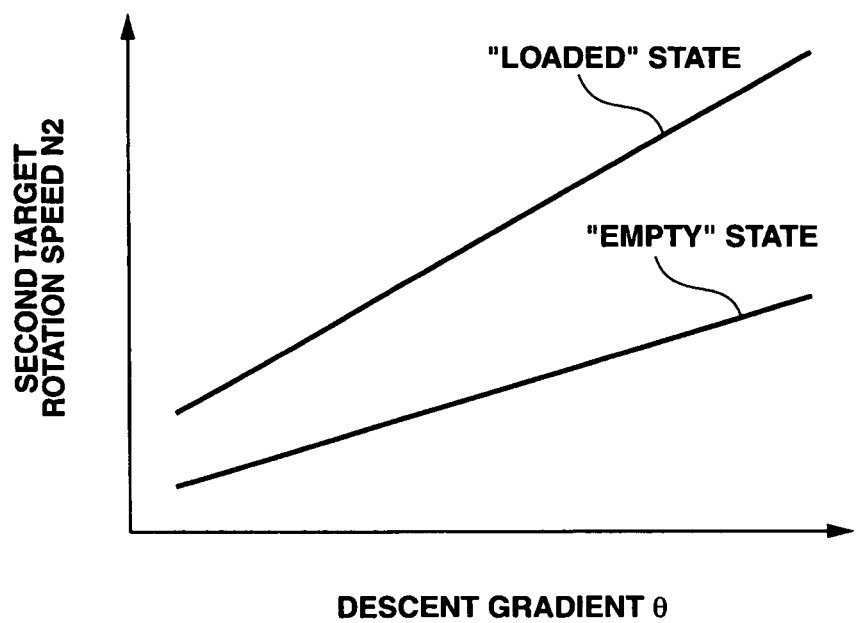
FIG. 14 shows the correspondence relationship between a descent gradient, vehicle load ("empty state" or "loaded state"), and second target rotation speed.

The invention claimed is:

1. A control device for a cooling fan in a vehicle, in which cooling oil supplied to an oil-cooled brake is cooled by the cooling fan, the control device comprising:
   a sensor that detects a temperature of the cooling oil;
   a lever that operates the oil-cooled brake; and
   a controller that includes control logic, which when executed:
      sets a first target rotation speed of the cooling fan, the first target rotation speed corresponding to the temperature of the cooling oil;
      sets a second target rotation speed of the cooling fan, the second target rotation speed corresponding to a brake operation amount of the lever;
      detects whether the lever has been operated and detects whether the vehicle has stopped;
      adjusts a rotation speed of the cooling fan to use the first target rotation speed, and not the second target rotation speed, when the controller does not detect that the lever is being operated;
      adjusts the rotation speed of the cooling fan to use the first target rotation speed, and not the second target rotation speed, when the controller detects that the lever is being operated and the vehicle has stopped; and
      adjusts the rotation speed of the cooling fan so as to obtain a higher target rotation speed of the first target rotation speed and the second target rotation speed when the controller detects that the lever is being operated and the vehicle has not stopped.

2. The control device according to claim 1, wherein the control device is applied to a vehicle in which an engine power is distributed to a travel power train and a hydraulic pump, and in which drive wheels are actuated via the travel power train, and the cooling fan is actuated via the hydraulic pump.

3. The control device according to claim 1, wherein the oil-cooled brake is a retarder brake.

4. The control device according to claim 1, wherein the oil-cooled brake is at least one of a retarder brake and a foot brake.

5. The control device according to claim 1, wherein
the controller calculates an estimated oil temperature rise amount of a brake cooling oil temperature corresponding to a current operation amount of the oil-cooled brake, and
the controller sets the second target rotation speed based on the estimated oil temperature rise amount.

6. The control device according to claim 1, wherein
the controller calculates a necessary fan rotation speed increase amount of a rotation speed of the cooling fan,
the controller calculates the necessary fan rotation speed corresponding to a current operation amount of the oil-cooled brake, and
the controller sets the second target rotation speed based on the necessary fan rotation speed increase amount.

* * * * *